US007856414B2

(12) United States Patent
Zee

(10) Patent No.: US 7,856,414 B2
(45) Date of Patent: Dec. 21, 2010

(54) ASSURED ARCHIVAL AND RETRIEVAL SYSTEM FOR DIGITAL INTELLECTUAL PROPERTY

(76) Inventor: Christopher Zee, #200, 6948 Leaside Dr. S.W, Calgary (CA) AB T3E 6H5

( * ) Notice: Subject to any disclaimer, the term of this patent is extended or adjusted under 35 U.S.C. 154(b) by 2465 days.

(21) Appl. No.: 10/102,663

(22) Filed: Mar. 22, 2002

(65) Prior Publication Data
US 2003/0065642 A1 Apr. 3, 2003

Related U.S. Application Data

(63) Continuation-in-part of application No. 09/864,038, filed on May 22, 2001, now Pat. No. 7,194,490.

(60) Provisional application No. 60/280,265, filed on Mar. 29, 2001, provisional application No. 60/333,760, filed on Nov. 29, 2001, provisional application No. 60/341,214, filed on Dec. 20, 2001.

(51) Int. Cl.
G06F 17/30 (2006.01)
G06F 7/00 (2006.01)
G06F 12/00 (2006.01)
G06Q 30/00 (2006.01)

(52) U.S. Cl. .................. 707/204; 707/104.1; 707/10; 705/1

(58) Field of Classification Search .............. 705/35
See application file for complete search history.

(56) References Cited

U.S. PATENT DOCUMENTS

| 5,758,057 | A | * | 5/1998 | Baba et al. ............... 714/7 |
| 6,092,090 | A | | 7/2000 | Payne et al. |
| 6,119,229 | A | | 9/2000 | Martinez et al. |
| 6,157,947 | A | * | 12/2000 | Watanabe et al. ......... 709/217 |
| 2001/0003099 | A1 | * | 6/2001 | Von Kohorn ............. 463/40 |
| 2001/0034617 | A1 | * | 10/2001 | Kimata ................... 705/3 |
| 2001/0034695 | A1 | * | 10/2001 | Wilkinson ............... 705/37 |
| 2002/0111824 | A1 | * | 8/2002 | Grainger ................. 705/1 |
| 2004/0083141 | A1 | * | 4/2004 | Lapstun et al. ........... 705/26 |
| 2004/0133793 | A1 | * | 7/2004 | Ginter et al. ............. 713/193 |

OTHER PUBLICATIONS

Kenney et al., Developing a Digital Preservation Strategy for JSTOR, an interview with Kevin Guthrie, RLG DigiNews, Aug. 15, 2000, vol. 4, No. 4.

Kevin M. Guthrie, Challenges and Opportunities Presented by Archiving in the Electronic Era, Paper presented at the JSTOR Participant's Meeting, Jan. 16, 2000.

(Continued)

*Primary Examiner*—Kuen S Lu

(57) ABSTRACT

A system and method of use for permanently archiving intellectual properties (IP) in a digital archival system. An owner contributes each IP with an initial financial contribution including a discrete archival endowment which is sufficient to fund archival of the IP for an assured archival period. A plurality of discrete archival endowments can be pooled into one or more archival endowment funds, jointly managed for the maintenance of each archived IP. The endowment funds can be managed by a trustee separate from the management of the digital archive. Retrieval can be funded through retrieval fees or an endowment maintained separate from the archival endowment fund. Digital rights management can remunerate owners and revenue tracking can capitalize the value of each IP. Access to the archive system is preferably through a variety of membership options including owners, users, and partners.

125 Claims, 10 Drawing Sheets

OTHER PUBLICATIONS

Kevin M. Guthrie, From Project to Independent Organization, D-Lib Magazine, Jul./Aug. 1997.

Bowen, William, JSTOR and the Economics of Scholarly Communication, paper based on a talk given at the Council on Library Resources Conferences, Washington, DC, on Sep. 18, 1995.

AIP Safe S.R.O., Digital Archive—Technical Description, webpage, http://www.aipsafe.com/eti-dig_arch.htm , Feb. 27, 2002.

AIP Safe S.R.O., Document Delivery—General Description, web page, http://www.aipsafe.com/eop-dds.htm , Feb. 27, 2002.

AIP Safe S.R.O., Workflow—General Description, web page, http://www.aipsafe.com/eop-wf.htm , Feb. 27, 2002.

AIP Safe S.R.O., Archive—General Description, web page, http://www.aipsafe.com/eop-archiv.htm , Feb. 27, 2002.

Task Force on Archiving of Digital Information, Preserving Digital Information, May 20, 1996, p. 38. (entire document available for download, in pdf format, at ftp://ftp.rlg.org/pub/archtf/final-report.pdf ).

Flecker, Dale, Preserving Scholarly E-Journals, D-Lib Magazine, Sep. 2001, vol. 7, No. 9.

* cited by examiner

Fig. 2
Conservative Case with 2% annual decline in Archival Operating Cost

Objective: To set up an endowment fund to generate annually:

For each $ 1.00 for Annual Archival Operating Costs for a given capacity
$ 0.25 for Annual contribution to Technology Sinking Fund
$ 0.25 for Annual Management Costs

Assumptions:
4.50% Long Term Secured Investment Net Annual Return (Active Management may yield higher returns) Applied to Endowment Fund and Sinking Fund
-2.00% Annual % escalation(decline) of Archival Costs due to technology advancement, in current $

| Year | Endowment Fund Principal | Endowment Fund Surplus | Endowment Fund Principal+ Surplus | Investment Return at 4.50% | Archival Cost Payout at infl. Rate -2.00% | Technology Migration SinkingFund Contribution 0.25 | Mgmnt Expenses 0.25 | Ending Balance | Technology Migration SinkingFund Balance 4.50% |
|---|---|---|---|---|---|---|---|---|---|
| 1 | $ 33.50 | $ — | $ 33.50 | $ 1.51 | $ 1.00 | $ 0.25 | $ 0.25 | $ 33.51 | $ 0.25 |
| 2 | $ 33.50 | $ 0.01 | $ 33.51 | $ 1.51 | $ 0.98 | $ 0.25 | $ 0.25 | $ 33.53 | $ 0.51 |
| 3 | $ 33.50 | $ 0.03 | $ 33.53 | $ 1.51 | $ 0.96 | $ 0.25 | $ 0.25 | $ 33.55 | $ 0.78 |
| 4 | $ 33.50 | $ 0.05 | $ 33.55 | $ 1.51 | $ 0.94 | $ 0.25 | $ 0.25 | $ 33.57 | $ 1.07 |
| 5 | $ 33.50 | $ 0.07 | $ 33.57 | $ 1.51 | $ 0.92 | $ 0.25 | $ 0.25 | $ 33.59 | $ 1.37 |
| 6 | $ 33.50 | $ 0.09 | $ 33.59 | $ 1.51 | $ 0.90 | $ — | $ 0.25 | $ 33.61 | $ 0.25 |
| 7 | $ 33.50 | $ 0.11 | $ 33.61 | $ 1.51 | $ 0.89 | $ 0.25 | $ 0.25 | $ 33.63 | $ 0.51 |
| 8 | $ 33.50 | $ 0.13 | $ 33.63 | $ 1.51 | $ 0.87 | $ 0.25 | $ 0.25 | $ 33.65 | $ 0.78 |
| 9 | $ 33.50 | $ 0.15 | $ 33.65 | $ 1.51 | $ 0.85 | $ 0.25 | $ 0.25 | $ 33.66 | $ 1.07 |
| 10 | $ 33.50 | $ 0.16 | $ 33.66 | $ 1.51 | $ 0.83 | $ 0.25 | $ 0.25 | $ 33.68 | $ 1.37 |
| 11 | $ 33.50 | $ 0.18 | $ 33.68 | $ 1.52 | $ 0.82 | $ — | $ 0.25 | $ 33.70 | $ 0.25 |
| 12 | $ 33.50 | $ 0.20 | $ 33.70 | $ 1.52 | $ 0.80 | $ 0.25 | $ 0.25 | $ 33.72 | $ 0.51 |
| 13 | $ 33.50 | $ 0.22 | $ 33.72 | $ 1.52 | $ 0.78 | $ 0.25 | $ 0.25 | $ 33.73 | $ 0.78 |
| 14 | $ 33.50 | $ 0.23 | $ 33.73 | $ 1.52 | $ 0.77 | $ 0.25 | $ 0.25 | $ 33.75 | $ 1.07 |
| 15 | $ 33.50 | $ 0.25 | $ 33.75 | $ 1.52 | $ 0.75 | $ 0.25 | $ 0.25 | $ 33.77 | $ 1.37 |

*Endowment Fund Surplus* — applied every five year

*Endowment Fund Multiplier*

For each $1 Annual Archival Operating Costs
Endowment required: $ 33.50 with anticipated surpluses of $ 0.25 in Year 15
Annual Provision for Technology Migration: $ 0.25 with migration at 1.37 every 5 years
Annual Provision for Management Expense: $ 0.25

Fig. 7

Phenotypic Plasticity:

The Plasticity of Sun and Shade Leaves on the Manitoba

Maple

Phenotypic variation is observed among organisms in all environments. Environmental variation causes organisms with benefit more than others. The can live within environmental otypic plasticity. This is a otypic change that benefits the onment. Leaves located at different tree (*Acer negundo* L.) appear to demonstrate phenotypic plasticity relative to amounts of radiation they receive. These leaves are a good specimen to examine because they contain characteristics that may vary in respect to the amount of sunlight the leaves receive. The leaves on the outer portion of the tree

| Chemistry |
| Physics |
| Biology |

Science | Politics

File Saved As

IP User ID

Folder Filed In

Keywords

Subjects ▲
People △
Project △
Date △
Other 1 △

Excerpts

Links

Received From

Drop Down Menus and Input Boxes

Input Tool Selection Window

*Fig. 8*

| Data Range | | Keywords | | | | | |
|---|---|---|---|---|---|---|---|
| From | To | Subject | People | Project | Other | Title | Author |
| 1999 2000 2004 ◄► | 1999 2000 2004 ◄► | Abcde Fghij Klmno Pqrst Uvwxyz | Xxxx Yyyy Zzzzz | 12345 67890 | Qwert yuiop | zxcvbc vbnm | Qssbgj sbcue |
| Jan Dec ◄► | Jan Dec ◄► | | | | | | |
| 1 31 ◄► | 1 31 ◄► | | | | | | |

To retrieve file, select date and one or more key words.

Or, specify folder and file.

☐ abcde
☐ hijkl
☐ mnopq
☐ rstuv

☐ wxyz
☐ abcde

Or, search using keywords.

Search Keywords

Metadata

Content

ASSURED ARCHIVAL AND RETRIEVAL SYSTEM FOR DIGITAL INTELLECTUAL PROPERTY

CROSS REFERENCE TO RELATED APPLICATIONS

This application is a continuation in part of U.S. patent application Ser. No. 09/864,038 filed on May 22, 2001 now U.S. Pat. No. 7,194,490 and is further related to and claims the benefit of co-pending US applications as follows: U.S. Provisional application Ser. No. 60/280,265, filed on Mar. 29, 2001; U.S. Provisional application Ser. No. 60/333,760, filed Nov. 29, 2001; and U.S. Provisional application Ser. No. 60/341,214, filed Dec. 20, 2001, the entirety of each of the four related applications being incorporated herein by reference.

FIELD OF THE INVENTION

The present invention relates to apparatus and methodology for the archival and retrieval of digital versions of intellectual property (IP) on an assured or permanent basis. More particularly, discrete fees are pooled in an endowment fund with other discrete fees for the assured permanence and accessibility of all of the archived IP. The invention is further related to methodology for archiving and indexing IP, managing ownership and earnings from the usage rights associated with all of the IP, for establishing methods for securitization of IP, and for enabling transfer between parties accessing the IP.

BACKGROUND OF THE INVENTION

The Present View

Presently, a significant portion of intellectual property (IP) is fixed in tangible form such as in books, journals, magazines and newspapers and music in compact discs (CD) and digital video discs (DVD). Such IP entail high capital and operating costs for their physical preparation, distribution and handling. The time lag between investment and sales revenue generation further increases the associated economic risk. Publishers, for the most part, publish only small portion of works that are judged able to clear high economic hurdle. Even after being published, most written works have limited shelf life given the high overhead costs. Most are then disposed of through discount and clearance channels. All these factors combine to limit the availability of IP to potential users. The use of a wide area network such as the Internet and World Wide Web (WWW or web generally) for retailing and subsequent physical delivery of such IP has greatly increased the accessibility of these forms of IP. However, the problem of costly physical handling remains unsolved.

The introduction and wide spread use of computers, particularly personal computers, held out the promise of a "paperless society", where most information is stored and retrieved electronically, thereby eliminating the need of paper copies. To date, this promise remains unfulfilled. The reasons are both technical and commercial. Technically, the main hurdles include: inconvenient access to information via machines, delay in scrolling one page of information at a time on computer screen, low display resolution, lack of portability and inability to easily annotate the information. Commercially, electronic storage and retrieval of information has only seen limited use due to high initial capital and operating costs for both providers of the content and users, and further due to challenges related to an indefinite and changing legal framework with which to deal with copyrights of electronic documents. The above hurdles in adopting a paperless society, most observable in printed documents, are also true for images and drawings, and to a lesser extent, for sound recordings and movies or videos.

Accordingly, the many benefits of electronic information storage and access are therefore still not realized. The lost benefits include: bringing vast amounts of content within reach of a large audience, significantly lower costs for physical production, storage and transportation, possible multiple simultaneous access, savings in energy and physical media, e.g., paper, and indirectly lower environmental pollution.

Internet

While the WWW has brought great access to a large group of users, the rapid and almost unstructured evolution of the WWW has also brought with it three key difficulties for owners and users of such IP, Firstly, the amount of information, presented in the form of web pages identified by Uniform Resource Locators (URL), is growing much more rapidly than the ability to search, locate and disseminate what is of interest to the users. By July 2000 there were reportedly 2.1 billion WWW pages, the numbers of which were then growing at about 7 million pages a day. The use of search engines to continuously comb and index the web pages has enhanced the ability of users to find the desired information on the WNW. However search engines are reportedly only able to search through only about 15% to 20% of all available web pages in existence. As a result, a large portion of the IP on WWW is out of reach for most users. The current technical attempts to solve the problem by using faster computers and more efficient search engine software are unable to keep pace. Secondly, to date, most web sites have provided free information to users. Accordingly, such precedents have forced web site operators to rely heavily on alternate sources of income such as advertising revenue which channels users through slow-loading web pages filled with advertising. Thirdly, even when users have found some useful information on web pages, it is difficult to save the information efficiently without capturing a physical snapshot or printed copy of the digital IP. Bookmarks can be applied to allow a user to return to specific web pages, but quite often the content is replaced by newer or different material, or the web page itself is lost due to web site redesign or business failure.

This expectation of free access by the WWW users in turn has caused many leading publishers to refrain from archiving current and past issues of their journals and newspapers online, in manners that can be accessed and searched by users. Well known sources such as Scientific American, Time and Harvard Business Report only offer, at relatively high user fee, archived material back less than a decade for online search and retrieval. Further, most smaller publishers cannot afford to set up and maintain archives.

As a result, a vast amount of accumulated knowledge is therefore beyond reach of users of the WWW.

Nevertheless, the WWW does provide digital versions of IP. However, the existing approaches are still steeped in the paradigm of physical paper documents wherein a printed paper product often still results such as:

physical clipping of news articles as a paid service with follow-up printed document delivery by courier, facsimile or mail;

online and offline sale of reprints of articles that appear in the corresponding printed publication and access to limited electronic archives covering a small fraction of the rich hardcopy archives;

commercial fee-for service databases enabling a small market population to search their proprietary databases, again for follow-up physical delivery; and the great volume of information available on web pages which is typically saved and duplicated onto the user's own digital storage, which should be indexed for future reference, but rarely is this discipline evoked; and commonly, the Uniform Resource Locators (URL's) of the web pages are 'bookmarked' for later access, if the bookmarks are not lost by the user or otherwise unavailable due to 'link rot', where the web page referred to by the bookmark link is no longer available due to deletions, content revisions or business failures. Further, bookmarking does not lend itself to applying annotations to the information on the web page.

The ability to annotate a document and retain such annotations is useful in identifying the user's own particular interest or critique of the IP material. Some companies such as Gemteq Software, Inc. (www.egems.com) of Novato, Calif. and Clickability Inc (www.clickability.com) of San Francisco, Calif. offer products that can copy web information files with attached bibliographical references and organize them or bookmarks into folders which can then be shared with others via email by themselves, or with annotations. Companies like Adobe Systems Incorporated (www.adobe.com), Microsoft Corporation (www.microsoft.com) of Redmond, Wash. and Palm (www.palm.com) of Santa Clara, Calif. currently offer software that allow users to annotate a document (highlight, underline, bookmark, add comments and signatures, etc.), and store the document with or without the annotations or store the annotation file separately. Note that presently, an annotation file must be defined and linked to a specific document and to use the annotation file, the user must have possession and properly should have rights to a copy of that original document.

The prior art approach to annotation files is that they are intended as a tool for editing and collaboration amongst peers and co-workers. Accordingly, the specific documents which are being annotated are typically not managed and protected by copyright and digital rights management (DRM), for the purpose of generating revenue to the IP provider. In addition, no such consideration has been given to, nor has provision been made for providing a personalized access structure, or for acknowledging arising derivative rights and the associated copyright protection available for the annotation files themselves. Moreover, Applicant is not aware of means for associating the annotation files themselves with access rights which are independent from the originating document. Further, no provision is made to allow linking of these annotation files to keywords, folders or pointers, in order to facilitate future access.

Some companies are selling online storage, such as backup, of files for remote access. Most offer some free initial storage volume. These are offered typically for private and non-commercial uses and have no provisions for digital rights protection. Others have suggested solutions such as storage of information in a distributed manner on the individual computers of many internet users so as to reduce storage costs.

Access is expected to be even further enhanced upon the technical development of ultra high speed optical and wireless access to the WWW with palm size devices with high resolution, processing power and battery capacity.

In practice, users access IP for either pleasure or reference. The reference use is typically of much higher economic value to the users than the pleasure use. The printed books and journals which are stored typically contain some pieces of precise information that the user would like to make note of and then save for easy reference at a later time. These users of reference IP are willing to incur the effort and costs of storage and handling to achieve efficient and assured access to the IP and the ability of users to further add value to the IP at a later time. This need for reference and verifiable information is most important and in demand in many professions including legal, medical, academic, political and business. The constantly growing supply of IP also necessitates periodic culling of collections of reference IP owned by individuals, businesses, libraries and governments, leading to ever increasing loss of access to large amounts of IP, most often irreversibly.

In summary, there are various methods and systems to index, search, store, retrieve or synchronize documents and files within an enterprise or via a distributed network such as the Internet. However, Applicant is not aware of prior art which provides assured and convenient storage, searching and access to permanent archives. Such assured or permanent storage and retrieval enables building of a users' trust and hastening of a true paperless system of IP storage and retrieval. Unfortunately, the business of digital storage, management and retrieval of IP involves capital and operating costs which are not available to all owners of IP and users of the IP, particularly individuals.

Commercial archiving of Digital IP

There currently exist a number of enterprises which take advantage of the economies of scale associated with archiving digital versions of IP in a database and then distributing copies of this IP interested users—typically via the Internet using an Internet browser.

For example, the OCLC Online Computer Library Center, Inc. (OCLC) of Dublin, Ohio, USA, currently at www.oclc.org, will digitize paper documents of an institutional owner of IP such as newspapers, books, manuscripts, photographs and more, to create a digital collection of IP. Meta-data and full-text search capabilities are added to a collection so that it is fully searchable. The OCLC also offers continual access to collections needed frequently, storage services for backups and data migration services to assure continued access to documents as digital storage formats are abandoned or changed over time.

The OCLC appears to restrict its archival storage services to participating libraries and other similar institutions. However, an individual is able, as member of a participating institution, to access and retrieve IP from OCLC's collections at low or minimal costs. Typically such an individual would obtain a membership at a participating library, access and search a particular collection and then obtain a print-out or electronic copy. With an internet connection, a user can also access the OCLC collections by first accessing the library's website, and then complete an authorization process before finally accessing the OCLC database directly from a personal computer through the library's site as a proxy.

Another enterprise is JSTOR of New York, USA, currently at www.jstor.org, which provides Internet distribution of digital copies of selected academic journals to institutional and individual users. JSTOR also provides full text and table-of-contents searching to assist in locating a particular IP. A related enterprise, ArtSTOR, has recently been announced with the aim of archiving digital versions of visual works of art. There is a perception of permanence with JSTOR's collection through implementing of disaster recovery steps such as mirroring of the central database and archiving of backup tapes at multiple sites. Applicant understands that some institutional users have some instances discarded entire paper titles with sole reliance on JSTOR's digitally stored versions of those journals.

This perception of permanence is only as strong as the institution funding the storage—while the potential of accidental loss is virtually eliminated, discontinuing to funding the storage will terminate the storage pursuant to normal commercial practices. JSTOR operates on funds received primarily through charging user fees. Typically the fee for an institution includes an annual access fee and an archive capital fee which is used to underwrite the cost of digitizing new collections and to fund the development of a reserve fund.

Applicants believes that a major disadvantage of OCLC, JSTOR and ArtSTOR is the fact that they are geared towards institutions and libraries and provide little, if any, opportunity for an individual to archive their own IP thereby take advantage of the economies of scale discussed above.

Other enterprises, such as AiP Safe s.r.o. of Prague, Czech Republic and NetDocuments of Orem, Utah, USA, are geared towards the deposit and internet access of IP by individual or business IP-Owners, such IP typically being documents created in the course of business, recovery being supported by off-line backups and redundancy features. They also offer additional features such as the ability to add descriptive metadata to each document to assist in searching, allow for subsequent editing or the addition of comments to the IP, and for third-party distribution. AiP Safe suggests that the cost of distribution of IP's to third-parties users should be paid by those parties, while NetDocuments proposes a free 3 MB account. NetDocuments also has provisions for the digital signing and time stamping of IP's. Other forms of IP, such as images, can also be distributed online to IP-Users. Adobe's Shutterfly (www.shutterfly.com) and Kodak's Ofoto (www.ofoto.com) are just two examples of enterprises which allow any person to submit and share digital images for little or no cost. However, Shutterfly and Ofoto do not focus on the permanent archiving of IP but rather on the distribution or sharing of IP. There is little, if any, aspect of permanence in AiP Safe, NetDocuments, Shutterfly, Ofoto and related enterprises. For example, Shutterfly reserves the right to cancel its service, or to discontinue accounts which have been inactive. Other similar enterprises, such as 1Finder (www.1finder.com) and Critical Path (www.docspace.com) appear to have ceased operating all together which has abandoned both the entity archiving IP and the users alike.

Funds are required to maintain the computer systems and databases, to provide Internet bandwidth, to allow for data migration, and to ensure disaster recovery. Contributing to the above enterprise's uncertain permanence or risk of complete cessation of services, is that they rely heavily on ongoing funding for such maintenance, whether such funding comes from service fees or from corporate/government allocation. All such funding is subject to be discontinued any time in the future. Even JSTOR, which charges its users a capital fee and establishes a reserve fund, recognizes that it could go out of business, even though its clients are institutions with substantial resources that are less likely to financially collapse in the foreseeable future.

This inability to assure permanence of any archived information has, to date, not been clearly recognized as a major obstacle for the long term use of IP, and the applicant is not aware of any methods or system to alleviate the situation.

An endowment fund is sometimes established in instances where ongoing funding is a factor in the permanence aspect of an enterprise. For example, large endowment funds are used to create perpetual scholarships, to support an enterprise generally, or to support the display a specified collection. However, such endowment funds do not contemplate archival of a plurality of individual works such as those held by individuals. Instead, such enterprises rely on charging an annual user fee based on calculations of global costs. For example, NetDocuments charges an annual fee but when the contributor of the IP stops paying, the IP is deleted and lost forever.

When IP is lost due to financial failure, it is not only the original contributor who is affected and suffers a loss; an entire community of IP-Users also loses access to that IP, sometimes forever.

A principle identified as Moore's Law (Gordon Moore, co-founder of Intel Corporation) has noted that the density of integrated circuits (the basis for digital storage and processing) has doubled approximately every 18 months. Further, the processing speed of computer processors have similarly enjoyed a corresponding improvement. These factors have enabled an explosion of the production of IP to the point that Internet search and management applications are struggling to keep up. On the other hand, technological advancements have also continuously increased storage capacity and reduced storage costs. Thus, it has now become foreseeable that it may be possible to archive digital versions of all IP, both ongoing and historical. It appears for the first time that such archival may be organized such that it is permanent or perpetual.

There is a demonstrated need for a system which capitalizes upon the increasing practicality of archiving ever increasing volumes of IP and where individuals and institutions alike can archive and retrieve IP and wherein there are mechanisms to ensure the permanence aspect of the system and the IP regardless of the financial future of the original contributor.

SUMMARY OF THE INVENTION

A novel integration of specific financial methods and systems with more traditional technical archival systems enables assured access to IP held in a permanent digital archive system, preferably in perpetuity or some lesser, yet known archival period. The IP is contributed by IP-Owners, their agents or other contributors. The contributors provide an initial financial contribution upon archival of each IP, the contribution including an initial capital cost and a discrete archival endowment, the quantum of the discrete archival endowment being sufficient to fund the maintenance of the IP in perpetuity or other such defined archival period. The quantum of the discrete endowment is based on actuarial calculations such as those for determining an initial capital amount or principal sufficient to generate a maintenance stream of funds which is directed to an operating entity maintaining the digital archive system. The archival costs can be based on specific characteristics of the IP being archived. Such a stream would include ongoing operating costs and may also include contingency provisions for the archive.

Applicant has recognized that the phenomenon identified by Moore, that costs continue to diminish, can be applied to particular advantage in the art of archiving materials. Specifically, as the cost of digital systems continually and significantly decline, one can fund digital archival into the future with a degree of certainty.

Preferably, for a plurality of IP, sustained economic viability of the plurality of small and discrete archival endowments is further ensured by pooling the discrete archival endowments into an archival endowment fund managed for the maintenance of all archived IP. Pooling minimizes management costs and allows the use of portfolio management to reduce investment risk. Separate trustee management, having a mandate which is distinguished and separate from those of the operating entity, can further protect the integrity and independence of the management of the archival endowment funds by providing credible and accountable management of the fund. For the first time, a system is available through which each contributor of IP can archive their IP at reasonable cost and be assured of its continuance for a fixed archival period which can extend into perpetuity as necessary. Additionally, preparedness in the unpredictability in changes to archival technology or technology migration, and to external events is preferably addressed by demanding from the IP-Owner a financial contribution which exceeds that minimum required alone for the discrete archival endowment. Further, portions of the financial contribution can be directed to a sinking fund and to an insurance mechanism.

Archived IP will almost certainly be periodically retrieved by the contributor themselves or others. Preferably the archival endowment fund ensures that the retrieval location of the IP is also permanent. With a distributed network, it is advantageous that a portal to the digital archive be repeatable or permanent. For a preferred system implementing access and retrieval through an Internet protocol, permanence is achieved using one or more permanent Internet Protocol addresses to the digital archive and to assign an internal permanent address to each of the one or more IP in the archive.

Note that there is a cost associated with retrieval which varies according to factors which can include the IP's specific characteristics and size. The cost of such retrieval is funded or otherwise maintained separate from the discrete or pooled archival endowment fund so as to separate the permanence of the archive from the volatility and vagaries of retrieval demand. A contributor can provide a separate contribution to fund an estimated or predetermined level of retrieval activity. Such a contribution could be provided at the time of the discrete archival endowment or at some later activation date.

A variety of preferred embodiments arise which are supportable once IP-Owners and the IP-Users are assured of the permanence of the IP and their access thereto. For the benefit of the IP-Owner, such embodiments include the ability to build a community of readers, reviewers and contributors which can assess the IP and a DRM system to ensure the IP-Owner receives proper compensation. Through management of the access and ownership of the IP, a variety of schemes for DRM and revenue generation can be applied. The integrated system also enables the precise receipt, management and distribution of appropriate financial compensation to stakeholders including authors, publishers and libraries, and to in turn realign the roles of publisher and libraries in the new information economy. In a further embodiment, a related facility utility enhancement system can further enhance the distribution of archived IP to a greater viewing audience by applying rights management to such IP and directed to facilities having underutilized capacity. This results in a corresponding increase in the utilization of exhibition facilities while continuing to assure the IP-Owner of compensation and adherence to the IP-Owner's rights by necessarily linking the archived data, access and DRM through the digital archival system.

For retrieval generally, IP-User obtains an access membership to the archival system, specifies a desired or preferred level of access to the IP, such as to view or download, and purchase the corresponding access rights by paying the access fee specified by the system and the IP-Owner. The system also manages payments to the IP-Owners.

For the IP-User, additional embodiments include the ability to create a localized access file for maintaining personalized access structure including identifying links and keywords to archived IP of interest, to index and cross-index related IP and create and independently store derivative works such as the users own comments and reviews. This access file can be shared with others. Derivative works can also be independently and permanently contributed and archived with the system with an appropriate discrete financial contribution as set forth above.

Inconvenience associated with establishing an online retrieval session, each time an IP-User wishes to exercise their purchased access rights, is obviated by permitting a restricted localized IP storage. Local storage of IP and an access file is enabled using proprietary custodial application software uploaded to the IP-User's computer, typically as part of their membership and access purchase. An IP-User's personalized access file is preferably stored locally on the user's access computer and is managed by a custodial system. The custodial system enables local storage of IP in a secured local folder while continuing to manage digital rights and copyright protection. The custodial software maintains a secure folder in which copies of the various IP, to which the IP-User has purchased access, are stored in encrypted form. The IP-User's own access file of links and derivative IP can also be so stored. The custodial application ensures that the access rights are not exceeded by the IP-User and that the IP is not normally transferable.

The localized copy enables local access by the IP-User without needing to be online, improving access and reducing the tendency for loss-conscious IP-Users to immediately print a hard copy merely for optimizing its security and convenience of access.

Further, such localized storage enables the controlled and secured transfer of a first IP-User's purchased access rights of the digital IP to another IP-User under the copyright doctrine of first sale, such transferability typically previously available only in the environment of physically rendered forms of IP.

Due to the permanence and control exercised over access to the archived IP, a historical stream of revenue can be determined and form the basis of financially valuing the specific IP. Such enhancements to the basic systems further enable new ways to create, enhance, communicate, organize, exhibit, rate, value, securitize, purchase, sell and capitalize IP. Significantly, this systematic and pervasive valuation and securitization of IP's has the potential to become the foundation of new capital creation in the information age.

These systems can also be extended to the archiving of IP for known or fixed terms without necessarily opting for permanent archival. These inventions are most suited for application to digital or electronic manifestations of intellectual properties. However, the principles can be applied to the discrete archiving of IP more broadly and including physical objects and the discrete funding for their permanent archival and independent funding for their access and presentation.

Accordingly, in a first broad aspect of the invention, a system is provided for archiving digital versions of IP comprising a communications network such as the internet; at least one archival computer system connected to the network for archiving a plurality of IP, each IP being associated with an archival period and an archival cost; an application program for receiving IP through the network and at the archival computer, said IP being contributed by or on behalf of an IP-Owner connected to the network, the application program further assessing the archival cost associated with archiving the contributed IP for the archival period and still further for determining a minimum quantum of a discrete archival endowment sufficient to satisfy the archival costs and thus maintain the IP in the digital archive system for the archival period without the need for further financial contribution; and commerce means for receiving an initial financial contribution from or on behalf of the IP-Owner so that upon receiving the initial financial contribution which is at least the minimum quantum of the discrete archival endowment, the application program archives the IP on the digital archive system and maintains the archived IP in the digital archive system for the archival period.

The system enables implementation of a broad methodology for storing of digital versions of IP comprising the steps of: establishing a digital archive system capable of receiving and storing IP contributed by an IP-Owner; receiving the IP contributed by the IP-Owner; assessing specific characteristics of the IP; receiving an initial financial contribution on behalf of the IP-Owner, at least a portion of which forms a discrete archival endowment having a minimum quantum sufficient to maintain the IP in the digital archive system for an archival period without the need for further financial contributions; archiving the IP with the digital archive system; and applying the discrete archival endowment to maintain the IP in the digital archive system for the archival period. Preferably, for a plurality of IP, the corresponding discrete archival endowments are pooled into an archival endowment fund for more efficient joint management and application. Further, the security and permanence of the archive system is enhanced by assigning a trustee for managing the archival endowment fund, the trustee having a mandate separate from management or entity responsible for operations of the archive system.

In another broad aspect of the invention, a system for managing the presentation and viewing of IP at an underutilized facility, preferably a facility an auditorium, comprises: a rights management system for storing and managing information relating to IP, preferably are audio-visual media or live performances; a facility availability database system for storing and managing information relating to the availability of the facility; a system for enabling a stakeholder to contact individuals targeted by the stakeholder as the audience for viewing the IP; a booking system enabling the stakeholder to arrange exhibition of the IP at the facility at specific times and terms; an information database for storing information relating to stakeholders and individuals of an audience; and a revenue determination, collection, accounting and royalty distribution system. Preferably, the system further comprises a system for the inspection and auditing of the facilities. Communications between the management system components is preferably though a communications network. More preferably, for enhancing audience recognition and repeat presentation, the facility utility enhancement system further comprises an application for generating supplementary information such as title and availability for addition to the IP for display during presentation.

The facility utility enhancement is preferably coordinated with the digital archiving system for management of the IP and the IP-Owners.

BRIEF DESCRIPTION OF THE DRAWINGS

FIG. 2 is a chart of one embodiment of one method for determining the demand on the archival endowment fund;

FIG. 7 illustrates a form of a GUI for facilitating access and annotation of IP by an IP-User;

FIG. 8 illustrates a form of a GUI for facilitating the searching and retrieval of IP by an IP-User;

DETAILED DESCRIPTION OF THE PREFERRED EMBODIMENTS

The System

Figure 1:
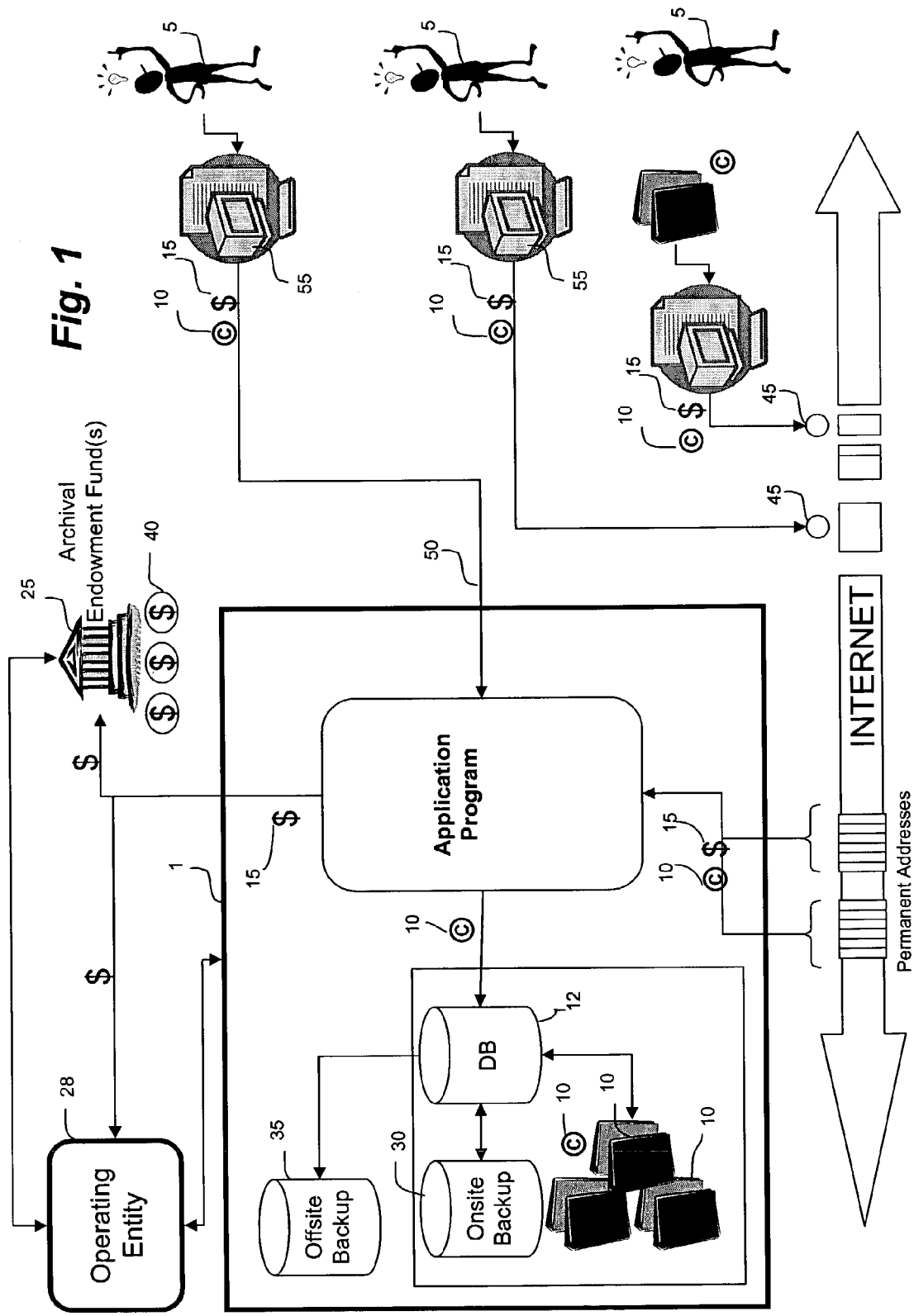
FIG. 1 is schematic illustrating one embodiment of the invention for receiving discrete endowment funds for the archival of discrete IP contributed by IP-Users and the relationship between the operating entity and the archival endowment fund (various clip art throughout are copyright Microsoft Corporation)

With reference to FIG. 1 and in a first embodiment, a digital archive system 1 is provided for the archiving of digital versions of intellectual property (IP) 10. Herein, as the context demands, the term IP is to be interpreted as representing either its intangible aspects or as being in a tangible form including a digital version. For example, for archival on the digital archive system 1, the IP would be understood to be in digital form.

Herein, IP is used in its broadest sense and is not to be limited to any particular form as our understanding of what constitutes IP is expanding continuously. Virtually anything, whether tangible or intangible, can be rendered in a form that would be considered IP. Further, any form of IP can be rendered in a digital version. In a conventional example, a pencil sketch can be digitized. In a less conventional form, a child's laugh can be recorded in digital format. Further, IP is usually associated with having an owner, however, any rights in what may have once been IP may have expired (i.e. it is now public domain). Accordingly, the definition of IP is herein expanded to include public domain materials. It is also arguable that once effort is expended in collecting public domain materials for archival that new IP is created.

Examples of tangible forms of IP include forms of written and printed words, graphics, audio, visual, video, various forms of multi-media, streaming media, software and the contents on computers, servers and distributed networks including peer-networks, intranets, Internet and world-wide web, and on radio and television broadcasting system and networks.

Embodiments are herein presented for subsequent access and retrieval of the IP 10 once archived. The system 1 comprises at least one distributed client-server network (well known and not detailed) which runs an application program 20 for managing the IP 10 and various interfaces, maintaining databases, and for handling handshaking and business transactions with users of the system 1. The distributed network comprises systems for access to one or more Internet, World Wide Web, virtual private networks (VPN), intranet or similar distributed communications networks. Without restricting the application to Internet access, simplification of this specification is achieved by assuming the use of a preferred access interface such as the Internet. The network comprises one or more computer and server systems. The network implements input/output interfaces such as physical media of e-communication access ports through which IP is transmitted and managed and further through which communication with users is effected. High capacity electronic storage systems are employed for storing archived IP in databases 12 and the application programs 20.

For disaster recovery preparedness, various known onsite and/or offsite disaster recovery systems are provided which typically including one or more mirror computer and server systems located physically at separate facilities. Onsite dynamic back-up systems are supported by onsite disk and/or tape back-up systems 30 and offsite disk and/or tape back-up systems 35. For access security purposes, firewalls, security and encryption systems are employed. Preferably, secondary and tertiary redundancy features are incorporated to encourage further archiving of valuable IP in additional databases and in turn create additional redundancy against potential loss. More preferably each IP, or set of IPs, may have different levels of redundancy from other IPs in the archive system 1.

Through the network, and in some instances through direct uploading of digital data, the IP is contributed by an entity such as the original creator of the work or another individual or entity which has an ownership interest in the IP (IP-Owner 5). Others included in the definition of IP-Owner, used herein, include those who are contributing IP as agent of an IP-Owner or another who is contributing public domain materials as the IP. For example, such materials could be contributed by any person or institution interested in its archival such as a sponsor for the IP's preservation.

Discrete Endowment

The IP-Owner 5 can contribute and store IP 10 in the system 1 with an initial, upfront and discrete financial contribution, at least portion of which is a discrete archival endowment 15. The quantum of the discrete archival endowment 15 provides a stream of funds, such as an annuity, which satisfies the costs of archival for the corresponding IP, assuring its permanence, or at least its storage and archival for as long as or as a short an archival period as may be desired by the IP-Owner 5. An example is the need to retain accounting or tax records secure for a fixed term. These IP may be flagged in the database 12 for notification of their non-permanent status. Typically, and due to the economies accomplished by the present invention, the cost for permanent or a perpetual archival period is likely comparable to the cost for shorter fixed archival periods.

A discrete archival endowment is provided and is associated with each specific contributed IP 10, in contradistinction to that normally provided in the prior art by institutions in which one fund applies to a plethora of contributions or collections.

Pooling Funds

Preferably, multiple discrete archival endowments 15 are aggregated or pooled into a one or more larger, pooled archival endowment funds 25. The funds from the discrete archival endowments 15 are jointly managed in the pooled archival endowment fund. The pooled archival endowment fund is invested and an annuity 40 results for the maintenance of all discrete contributed and archived IP. This pooling enables efficient and effective management and minimizes risks, much like individual investors pool their investments into mutual funds yet retaining their pro-rata ownership of the pool based on the quantum of their discrete archival endowment. IP-Owners 5 benefit from a pooling of resources and associated risks with the liquidity increasing and risk profile diminishing with the growth of the participating population of IP-Owners 5.

The quantum of each discrete archival endowment can be determined using actuarial calculations. An example of a simple actuarial calculation of the costs necessary to implement the digital archival system includes considerations of both capital and operating costs over the archival term. Examples of capital costs include the acquisition cost for servers, mirror servers, electronic storage, communications equipment and onsite and offsite disaster recovery equipment. Operating costs can include contracted disaster recover services and management of the system overall.

Accordingly, the cost to store a specific contributed IP 10, for a particular term, is a function of the population of a plurality of IP-Owners 5, the size of the contributed IP 10, the capital costs, and the operating costs. Both operating and capital costs can vary dependent upon the amount of initial storage capability provided.

In one aspect, the quantum of an initial discrete archival endowment 15 is therefore based on the specific characteristics of the particular IP 10 that is to be contributed for storage. Optionally, where different levels of redundancy are possible for differing IP's (as described above) the quantum of the initial discrete archival endowment 15 will also be based on the level of redundancy used when storing that IP 10. In most instances, the initial financial contribution by the contributing owner includes the one-time discrete archival endowment 15, the quantum of which is determined so as to assure permanent storage of the contributed IP 10. Further, the quantum of this one-time discrete archival endowment 15 a function of conservative actuarial calculations which establish the value of the principal of such an endowment that is necessary to generate a sufficient stream of funds through investment revenue or annuity 40 to cover the financial cost of archiving the specific contributed IP 10 in the system 1.

As set forth in the embodiment of FIG. 1, the system 1 is under the control and management of an operating entity 28, which may be an individual, corporation, co-operative, society, or other entity. In the instance where the operating entity is a for-profit organization, a portion of an initial financial contribution comprises the initial discrete archival endowment 15 and further comprises an amount earmarked as a profit margin, which is not related to the quantum ultimately applied to the archival endowment fund 25.

Fund Management

The management of the archival endowment fund 25 is preferably controlled by one or more third party individuals or organizations. The management must be selected and authorized to supervise the fund 25.

More preferably, a separate trustee is installed as necessary to insulate the funding of the archive operation from the economic or policy fluctuations and changes affecting commercial operations of the operating entity that may endanger the permanence of the archival operation. This separate trustee management, having a mandate which is in alignment and co-ordination with, yet distinct and separate from those of the operating entity, can further protect the integrity and independence of the management of the archival endowment funds which provides credible and accountable management of the fund.

The archival endowment fund ensures that periodic streams of revenue or annuity 40 are made available to the operating entity 28 as necessary to cover the cost of the continuing archival of individual and groups of IP 10. To monitor the health and management of the fund, periodic audits and assessments are conducted and reports are issued on the continuing viability of the archival system 1.

Figure 6:
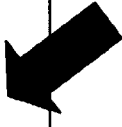
FIG. 6 illustrates a form of a GUI for facilitating the contribution and description of IP being contributed by an IP-Owner.

Referring again to FIG. 1, the application program 20 serves as a user-interface to accept a contribution of IP 10 from the IP-Owner 5. As described in greater detail below, an example of such an interface is shown in FIGS. 6 and 7, and which are drawn from a veritable multitude of possible interfaces. The application program 20 calculates the quantum of an initial financial contribution including the discrete archival endowment 15 based on specific characteristics of the contributed IP 10 to be archived. Further, the program 20, or a third party e-commerce provider, handles the commerce transaction for receipt of payment of the initial financial contribution and for distribution of at least a portion of the contribution into the discrete archival endowment 15 and further into the archival endowment fund 25. All IP 10 is archived in the system 1 is subject to regular, periodic backups of the IP 10, including mirroring and onsite 30 and offsite 35 backups to ensure that the IP 10 will permanently survive normal hazards. As stated, the archival endowment fund 25 generates an annual investment revenue or annuity 40 which is sufficient to cover the annual archival costs of a plurality of IP 10 in the system 1.

Quantum of the Discrete Archival Endowment

While more complex actuarial methodologies can be applied to determine the quantum of the discrete archival endowment 15, an example of a simple form is disclosed in more detail as follows. Determining a discrete archival endowment 15 begins with a determination of system capital costs which include assessing factors such as equipment and storage capacity, backup and network interfacing infrastructure. Once this is determined, and using a single mirror site having at least the same characteristics, then for example a $32,000 system having 640,000 MB of storage and with a $32,000 mirror system will result in a magnitude of the capital costs for this hypothetical system being about $0.10 per MB. Costs set forth herein are estimated in Canadian dollars and not meant to be accurate or limiting.

Further calculations are applied to determine the amount of the per unit periodic operating costs, such as per MB per annum, for one embodiment of a computerized system. Factors affecting the operating costs include annual storage costs. Such costs which are typical for a small commercial backup service are about $2400/15,000 MB or $0.16/MB. Removing the amortization and profit margin from the commercial services results in a conservative estimate of the archival portion of the operating costs by the operating entity 28 being about $0.13/MB.

Having reference to FIG. 2, sample calculations are illustrated which determine the present value quantum of the required discrete financial contributions to the discrete archival endowment for each unit of the annual archival operating costs. For instance, in one example with assumed rates of return 61 on investments of about 4.5%, it can be determined that in order to earn a return 62 of $1.00 per annum towards archival costs, and reserve $0.25 towards the sinking fund 63 and apply $0.25 for fund management 64, requires about $33.50 as the principal of the discrete archival endowment 15. Actually, as shown in FIG. 2, this scenario results in a small surplus each year. This represents a capital rate multiplier 65 of about 33.5. Other significant factors can include consideration of the principles identified by Moore and acknowledge an annual decline 66 of archival costs due to changes in technology. A decline 66 of about 2% is a conservative as the Moore effect has historically been about 50% decline every 18 months.

Accordingly, by applying the rate multiplier 65, having a value of 33.5, to the archival operating costs of $0.13/MB, the quantum of the initial financial contribution from an IP-Owner 5 necessary for sustaining a discrete archival endowment 15 capable of generating, in perpetuity, annual revenue for archival operating costs 62, technology sinking fund contributions 63, and management costs 64 would have to be at least 0.13×33.5=$4.36/MB of the IP. Adding an additional financial contribution to satisfy the initial capital cost of $0.10/MB brings the total quantum of the required initial financial contribution to $4.46/MB. Further one could provide a small contingency which, if selected at 10%, would result in a total financial contribution of $4.91/MB or approximately $5.00/MB.

For providing further security, insurance can be obtained to provide for costs that may be incurred due to unforeseen future events and perils related to the archived IP in the system 1, over and above those covered by normal operational insurance.

Membership

To facilitate retrieval of IP without compromising the IP-Owner's inherent rights to manage the IP, the system 1 is adapted for establish a members-only Community of IP-Members comprising IP-Owners and IP-Users.

The system accepts individuals or organizations and invites them to join as a voluntary, fee-paying IP-Owner or an IP-User. Access to the system is enabled using proprietary custodial application software uploaded to the IP-User's computer, typically as part of their membership and access purchase.

An IP-Member is provided with secure access such as through a unique user identifier and user password combination. The IP-Member can select one of several membership types and fee structures, and to remit the appropriate initial and sustaining membership fees. Optionally, the system encourages the IP-Member to acknowledge or undertake to abide by specified ethical and operating guidelines of the Community. Under such operational parameters, an IP-Member may be subject to guidelines for inadmissible content such as that restricting contributions of IP by an IP-Owner which offend public standards including pornography or hate-directed literature. The system would receive, investigate and act upon complaints against an IP-Member for violation of Community guidelines and assess consequences upon the IP-Member including specified sanctions, financial penalties and ultimately revocation of the IP-Members membership to the community, its rights and privileges, including access to the digital archive system.

The secure access to the system is established through an identity authentication system to verify the IP-Member's identity. Additionally, and related to Community guidelines for submission of IP, the IP-Owner's authority to contribute the IP is established. Preferably, the nature of the ownership status of the IP is asserted by the IP-Owner through an online declaration. The declaration establishes the IP-Owner's legal identity and the true legal copyright ownership of the submitted IP. The IP-Member's identify can be established with the provision of personal information, subject to confidentiality and privacy considerations. Optionally, authorized authentication agents, notaries or legal counsel can be employed for authenticating the true legal identity of the IP-Member through the examination of submitted or extrinsic evidence. Optionally the identity authentication system utilizes electronic identification means to subsequently confirm the IP-Owner's identity; including means such as digital certificates, CPU identification means, and storage media identification numbers.

Optionally, the system provides for the IP-Members to set up an account in the Community by depositing into the account a monetary amount balance, or purchasing a number purchase credit or points or similar units of value, termed IP-Points, that are defined by the operating entity and then which allows the IP-Member to purchase a desired access to IP by authorizing deduction from their member account the applicable monetary amount, number of purchase credit, points or other units of value. A system can be employed for awarding IP-Points to IP-Members for certain participation in the digital archive system 1.

Steps for Contribution of IP

Figure 3:
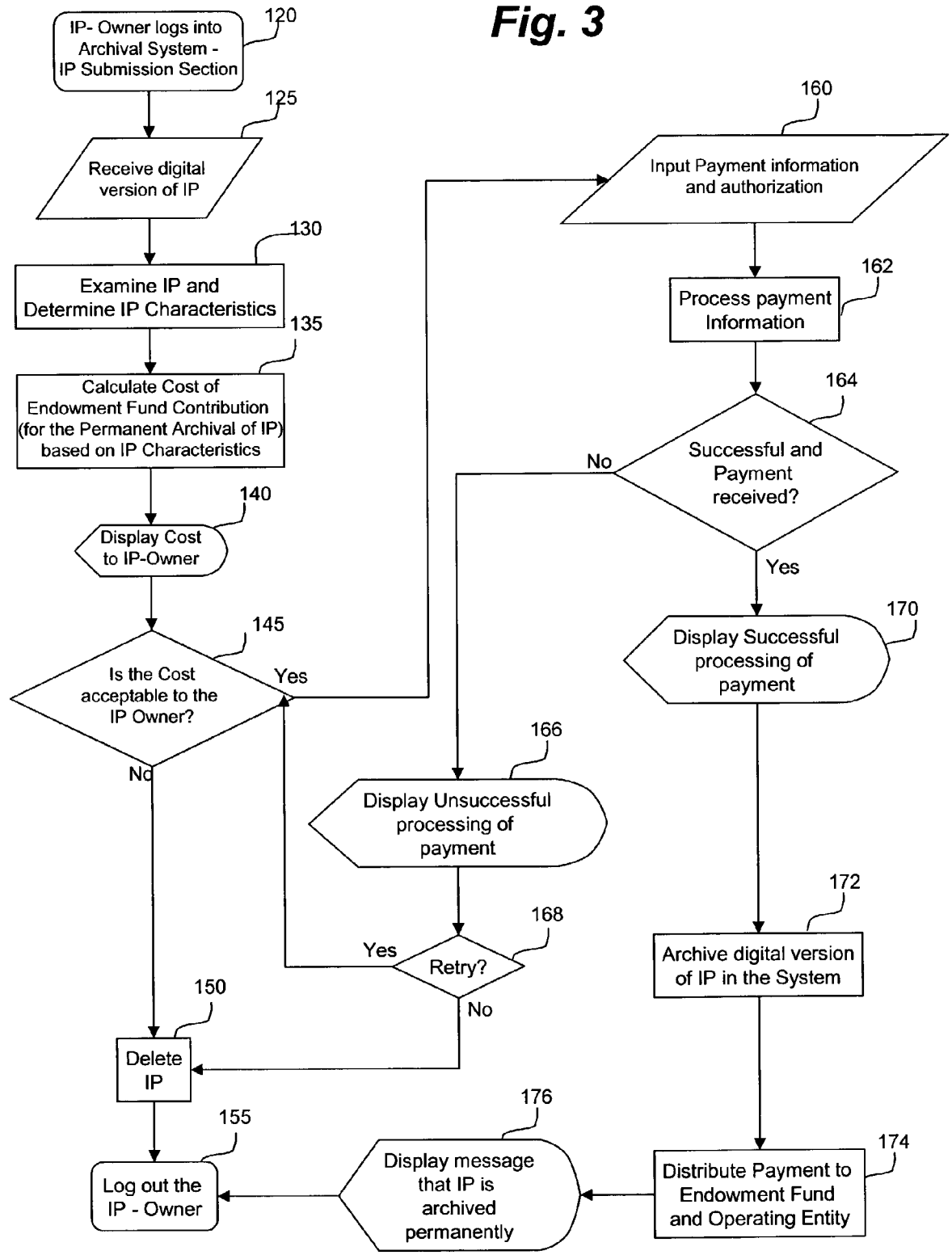
FIG. 3 is a flow chart according to FIG. 1 in which the system accepts IP and a corresponding endowment fund contribution.

With reference to FIG. 3, the steps for the submission or the contribution of IP by the IP-Owner to the archival system are illustrated. The identity of the IP-Owner or agent is preferably established through the identity authentication system discussed above, but other identification means can be employed.

An IP-Owner is provided with secure access, such as through a unique identifier and a password, and will log into 120 the archival system. The access is typically provided through a proprietary software application and interface which is obtained from the system, such has through downloading from the system 1.

The archival system receives 125 a digital copy of the IP from the IP-Owner and then examines and determines 130 the IP's characteristics. Retrieval options can be posed and costs assessed. The digital format of the IP may have to reformatted. An approved, designated agent can be employed to perform the format conversion through an approved communication channel.

After the characteristics of the IP are determined 130, the application program calculates 135 the cost of the initial financial contribution including the discrete archival endowment 15. Continuing with the above example, if the IP is 4 MB in size and the required financial contribution is $5.00/MB (as described in the above example), then the application program multiplies the value of the IP's MB-size with the cost per MB and determines that the discrete archival endowment contribution is $20.00.

A cost is displayed 140 to the IP-Owner who is then asked 145 if that cost is acceptable. This cost is at least the amount of the amount required for the discrete endowment, but can also include additional fee such as those required for sinking funds, insurance, and a margin charged by the operating entity. Other costs include an additional independent amount for any retrieval options identified as described in greater detail below. Should the IP-Owner indicate that the cost is not acceptable then the application program will delete 150 the downloaded copy of the IP and log-out 155 the IP-Owner from the submission section. Should the IP-Owner change his or her mind at a later date, steps 120-145 can be simply repeated and the IP-Owner can then indicate that the cost is acceptable.

Should the IP-Owner indicate that the cost is acceptable then the application program requests and receives 160 payment information, processes 162 that information, and determines 164 if payment has been received by the operating entity. For example, an IP-Owner can submit some form of payment, such as a credit card number and expiry date, for processing by the application program. If the payment has not been successfully received, a message is so displayed 166 to the IP-Owner who will then be asked 168 if he wishes to retry or resubmit the payment information. If the IP-Owner answers Yes then the application program returns to step 160. If the IP-Owner answers No then the application program will delete 150 the downloaded copy of the IP and log-out 155 the IP-Owner from the submission section.

If the payment has been successfully received a message indicating this will be displayed 170 to the IP-Owner, the IP will be archived 172 in the system, the payment will be distributed 174 to the appropriate places (i.e. the portion of the payment relating to the discrete archival endowment 15 is deposited into an endowment fund 25 and any extra fees will be distributed to the operating entity 28), and a message will be displayed 176 to the IP-Owner that the IP is now archived permanently. Finally the IP-Owner is logged-out 155 from the submission section.

Preferably, along with submitting the digital copy of IP to the system, the IP-Owner provides a set of meta-data applicable to that IP, including citation information of related IP, copyright, ownership, licensing and assignment information, and maturity, language, sex, violence rating information. The set of meta-data may also include information such as title, keywords, owners and authors information, ISBN number, ISSN number, Digital Object Identifier, Universal Resource Name, volume number, issue number, issue date, page number, abstract, executive summary, excerpts, trailers and promotional information, broadcast information such as television or radio stations/network, date and time of first and other important broadcasts, performance information such as date, time and venue of first and other important performances, exhibition information such as date, time and venue of first and other important exhibitions.

More preferably, along with submitting the digital copy of IP to the system, the IP-Owner provides a declaration which establishes the IP-Owner's legal identity and the true legal copyright ownership of the submitted IP.

Optionally, the IP-Owner can, along with submitting the digital copy of IP to the system, specify a list of names of one or more individuals or entities that may have access to the IP. By specifying such a list of names, the IP-Owner can exclude generalized access to the IP by IP-Members. For example, an IP-Owner may wish to archive a digital copy of his Will and have it accessible only by certain family members. By providing a list of names to the application program, the application program will then restrict the IP's retrieval and access to only those individuals on the list.

Optionally, the IP-Owner can, along with the list of names, provide the desired method of access security (such as encryption, password, digital certificate, CPU ID or biometrics) for each individual. The list of names and desired method of access will then be used by the application program to limit retrieval of the IP according to the information provided.

Optionally, the IP-Owner can, along with submitting the digital copy of IP to the system, specify one or more specific access levels to the IP, selected from a spectrum of access levels including: viewing, annotating (including underlining, highlighting, commenting and attaching other documents), printing, excerpting, copying, reprinting, linking, applicable to single-access, multiple-access, time-based-access, elapse-time-access, perpetual or other accesses. By providing a list of access levels to the application program, the application program will then restrict the IP's retrieval and access to those the list.

Optionally, the IP-Owner can specify an access fee, payable by an IP-User to the IP-Owner, for access to the IP. Preferably, this fee is incorporated, along with retrieval costs and other fees, into one retrieval fee paid by an IP-User to the operating entity when retrieving the specific IP as further described below; where preferably the operating entity collects the IP-Owner's access fee from the IP-User, as part of the retrieval fee, and then forwards the access fee to the IP-Owner.

For example an IP-Owner may log into the archival system, navigate to, and log into, the submissions section of the system, and initiate a download by the system of a digital copy of a corporate report in Adobe Acrobat™ (pdf) format. The IP-Owner also adds meta-data information and a list of names of those individuals in the company that are to have access to the archived IP. The system then receives the meta-data, list of names, and digital copy of the corporate report, analyze the digital copy, and determine that the IP is 4 MB in size. Application programs allowing for users to securely log into a computer system, provide metadata and lists, download files from a user's computer, and to analyze the characteristics of the downloaded file are well known to those of skill in the art and will not be reiterated herein.

Further, the application program 20 will 'version-lock' and 'time-stamp' the IP 10, upon archiving, to ensure that no changes can ever be made to that IP or to the time, size, format, version characteristics or to the submitted meta-data. More preferably, the application program 20 allows additional meta-data and citation information to be added to the system 1 and to be associated with a particular IP 10, without impairing the integrity of the version-locked and time-stamped archived IP.

Ownership Registration, Searching and Transfer

In the preferred embodiment of the system 1, the IP-Owner 5 of each IP 10 is identified by an appropriate entry or flag in a database 12. The identity of the IP-Owner 5 is preferably established through the identity authentication system discussed above, but other identification means can be employed. Preferably, the database is searchable by IP-Members and has additional entries for each IP 10 including time stamps and meta-data to assist in searching. More preferably, the system 1 can issue confirmation of ownership of a specific IP 10 to IP-Members. This confirmation can be accomplished through a variety of means, including through real-time access, digital transmission or printed certificates.

In the preferred embodiment, the application program 20 of the archival system 1 can transfer ownership from the IP-Owner to another IP-Member by simply adjusting the appropriate entries in the database 12. Such a transfer in ownership can be initiated in a number of ways, including at the request of the IP-Owner when the IP-Owner sells or gives away the ownership of the IP to another IP-Member, or by the operating entity 28 in response to a statement or affidavit by the IP-Owner or in response to a mandate by a third party, for example where a court judgment mandates the operating entity to effect a change in ownership (like a bank and a garnishee). Preferably, the application program 20 can effect the switch upon confirmation of receipt of payment by selling IP-Owner or receipt of a mandate.

More preferably, the archival system 1 has additional features relating to ownership registration and transfer, including allowing an IP-Owner to pledge the IP as security to another IP-Member, providing notification of such a pledge in subsequent searches, preventing ownership transfer of pledged IP, providing an ownership title escrow system to only effect the change in ownership with concurrent confirmation of payment, and providing an ownership title insurance system to protect a buying IP-Member from potential losses arising from any dispute of ownership of the specified IP's bought.

Retrieval of IP

The system 1 also manages an IP retrieval system. Upon contributing the IP 10, or some later date, an IP-Owner 5 is given an option to permit retrieval of their IP 10 by others, according to their pre-determined available access levels. For example, an IP-Owner 5 may wish to allow the IP-Members at large to have access to the IP 10 or may wish to restrict access to a certain group or event to a single individual.

The cost associated with each retrieval of IP 10 may be addressed in a number of ways. This may be as simple as implementing a pay-per-retrieval system which charges the IP-User a retrieval fee for each retrieval, the retrieval fee being a function of the retrieval cost, the IP-User's preferred access level to the IP, and any access fee payable to an IP-Owner. Other schemes include reduced fees for subsequent retrievals, advertiser-paid, sponsor-paid, or even paid by the IP-Owners themselves.

An IP-Owner can also use funding techniques similar to those applied in determining an archival endowment to fund IP retrievals. A discrete cost can be determined for retrieving each specific IP. The determination of costs associated with retrieval of IP is well known to those of skill in the art and will not be reiterated herein. Generally, a discrete cost to retrieve each specific IP is determined from factors including defining or forecasting the potential and the desirable number of retrievals of the specified IP on a periodic basis—a rate of retrieval. This discrete cost can be funded from a retrieval endowment fund 26 (FIG. 5) which provides future periodic (monthly or annual) annuities required to support the specified number of periodic retrievals of each specific IP, in perpetuity or for another period, taking into account technical advancement and allowances for technical migration, user functionality improvements and operational contingencies.

As set forth earlier, actuarial calculations can be applied for determining the amount of an initial retrieval endowment fund required to generate the computed initial and ongoing costs of retrieving each specific IP at the forecast retrieval rates and to receive and provide ongoing management of a retrieval fund for each IP. If the forecast retrieval rates are maintained, then the initial retrieval capital fund acts like an endowment fund as described above. However, any variation in retrieval activity can result in a reinvestment or a depletion of the principal of the fund. Optionally, may stipulate that the number of retrievals paid for by the endowment is limited to the extent of available annuity income, so that the endowment principal is not diminished.

The funds for a retrieval fund are not mingled with the archival endowment fund. While a retrieval fund can support only a finite number of retrievals over time without depleting the principal of the retrieval fund, other scenarios include the fact that the actual numbers of retrievals may be greater than the forecast amounts and the retrieval fund would not be self sustaining. As before, variability of retrieval costs can be minimized using a pooled management system to aggregate individual retrieval funds into one or more larger "pools" which can be managed by third party individuals or organizations or separate trustees, selected and authorized to supervise the funds. Pooling is particularly advantageous when sponsors are available to donate to the pool for an earmarked area of IP which can be used to increase the number of permitted retrievals. Should a retrieval fund for a specific IP or for pooled IP become depleted, then the IP-Owner can be notified and given the opportunity to "top-up" the fund or seek other forms of funding in the conventional manner.

For providing further security for the retrieval fund, insurance can be obtained to provide for costs that may be incurred due to unforeseen future events and perils related to the archived IP in the system 1, over and above those covered by normal operational insurance.

To enhance efficiency, risk management, growth and income generation, the management of the archival endowment fund 25 and retrieval fund can be under a combined management system using an asset allocation model.

IP Sponsors

Charitable foundations or organizations can provide donations or financial contributions which can be directed towards the archival endowment fund 25 or the retrieval endowment fund 26. Such financial contributions can be earmarked for the sponsorship or subsidy of one or more specific IP, specific classifications of IP, towards all of the IP, or towards the general operation of the archival system or archival and retrieval endowment funds. The effect can be to provide added assurance to the preservation of the IP or active acquisition of additional IP. Alternately, these additional contributions could result in lowering the first financial contributions by late-contributing IP-Owners who qualify in the earmarked class of IP. Again, in one arrangement, trustee management manages the funds from the charitable foundations, aligned and coordinated with, but separate from, the operations of the entity managing the system 1.

Access to IP

Figure 4:
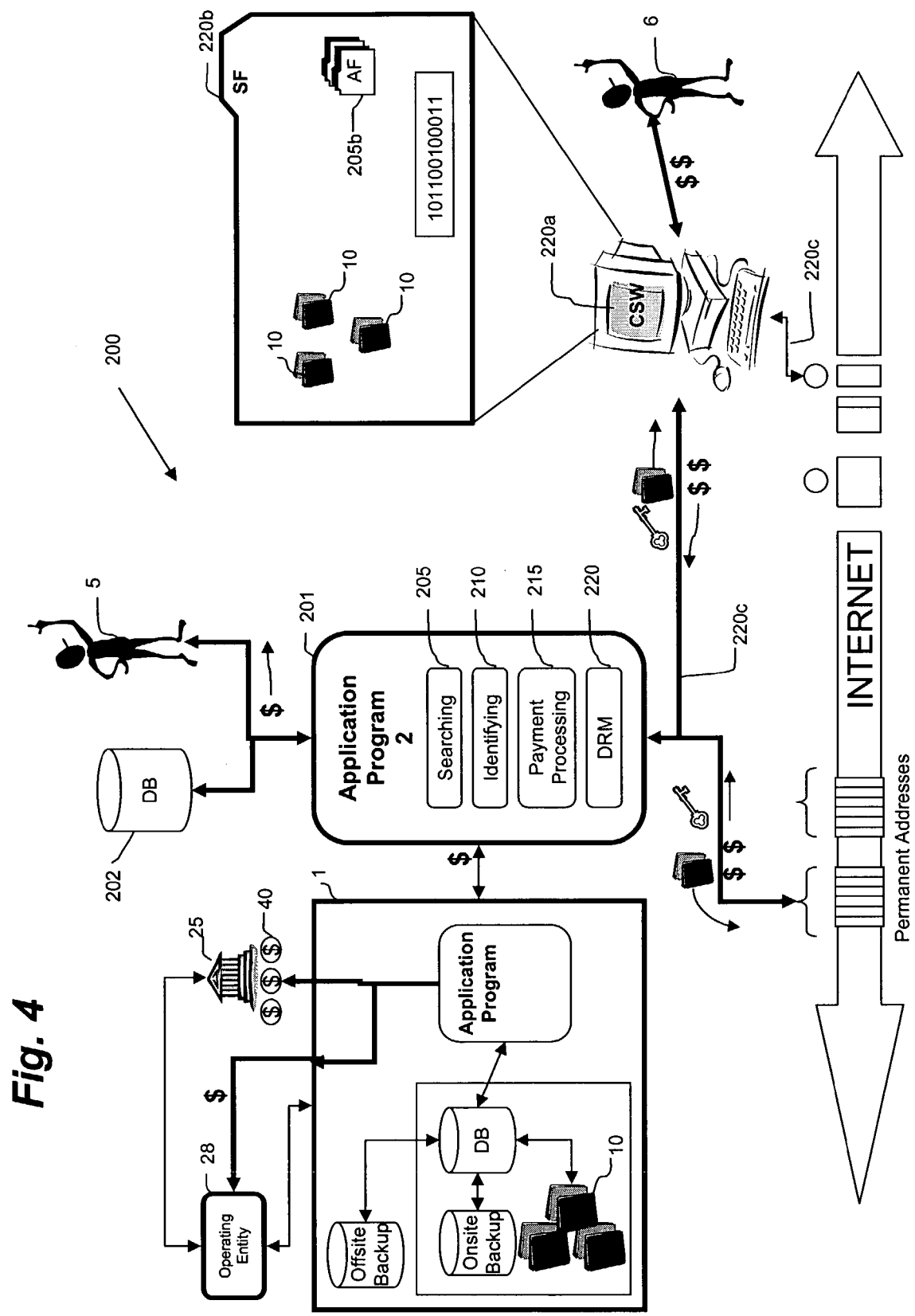
FIG. 4 is a schematic illustrating DRM and retrieval of archived IP.

With reference now to FIG. 4, an IP access and purchase System (IP-APS) 200 is demonstrated for permitting IP-Members to purchase access to archived digital IP 10 in the system 1. The IP-APS, as described below, enables an IP-Member such as an IP-User 6 to select a desired level of access and pay the appropriate fee. To avoid frustration associate with mandatory online connection to the system 1, such access includes the ability to keep local copies of the IP. Local software incorporating digital rights management (DRM) ensures the IP-Owner's rights are not compromised.

The IP-APS 200 includes an application program 201, IP searching means 205, IP-User identifying means 210, payment processing means 215, and DRM means 220. The application program 201 in this embodiment is shown to include, as sub-components, the searching 205, identifying 210, payment 215 and DRM 220 means, however in other embodiments the organizational structure may be different. Preferably, the system 1 is that of the embodiment described in FIG. 1 including the archival endowment fund 25 aspect, but other embodiments can be utilized.

The IP searching means 205 enables a member IP-User 6 to search the archival system 1 for a specific IP 10, generate a listing of search results, allow selection of items therefrom and to initiate access to the selected item. Preferably the searching means 205 compares the IP-User's preferred access level with the available access levels for the IP being searched and display a list of IP for selection. An example of a search interface is shown in FIG. 8. Other IP searching means could provide additional features, such as enabling the IP-User 6 various options to browse the archival system 1. IP searching means 205 are well known in the prior art, including those utilizing Internet browser software, web-site interfaces and server databases. Such search means can aggregate, analyze, cross-reference and resolve citation and hyperlink information from all archived IP and index each IP archived in the community using a variety of information tags such as metadata, keywords, subject, title, author, referenced by, creation dates, other publication dates, etc. Further, when available, the searching means organizes and links reviews, critiques, summaries and evaluations of an IP with the subject IP.

To facilitate access using such a distributed network, it would be important that the location or portal to the digital archive have a consistent location or permanence. In the current system of Internet Protocols, system would utilize one or more permanent Internet Protocol addresses. Similarly, each IP can have an internal permanent address. Means of identification can include multi-component alphanumeric codes as follows: a code based on the date and time of receipt; a code based on the date and time of archival of the IP; a running serial number, based on the cumulative total of IP previously archived, or a variation thereof; a code to cross-reference information such as the IP Owner Member's identity, print publication name, volume and issue date; a code denoting type, subject, keywords and other information; or a combination of existing numbering/identification systems including ISBN, ISSN, DOI and URN.

The member identifying means 210 identify the IP-Users 6, and IP-Owners 5, to the system 200. Identification of the parties 5,6 involved is crucial to ensure that payments for access to a specific IP are charged to the proper IP-User 6 and, once received, an appropriate portion is forwarded to the proper IP-Owner 5. Prior art identification technologies exist, including the conventional system where individuals sign up as a member with the system and are supplied a username/password combination for subsequent log-ins. Additional levels of security and identification can be accomplished through the use such means as digital signatures, digital certificates, smart ID cards and biometric devices. Again, digital signature and digital certificate technologies are known to those of skill in the art, including those by VeriSign, Inc. of Mountain View, Calif.

The payment means 220 function to calculate the amount of the retrieval fee an IP-User 6 has to pay to obtain their preferred access level to the specific IP, such as to receive a particular copy of an IP 10, to accept payment information (e.g. credit card information) from an IP-User 6, to process individual transactions so as to obtain payment from the IP-User 6 and to forward revenue to the operating entity, IP-Owner 5 and other stakeholders that the IP-Owner 5 has identified. Electronic payment processing technologies are also known in the art, including those by VeriSign, Inc.

Figure 5:
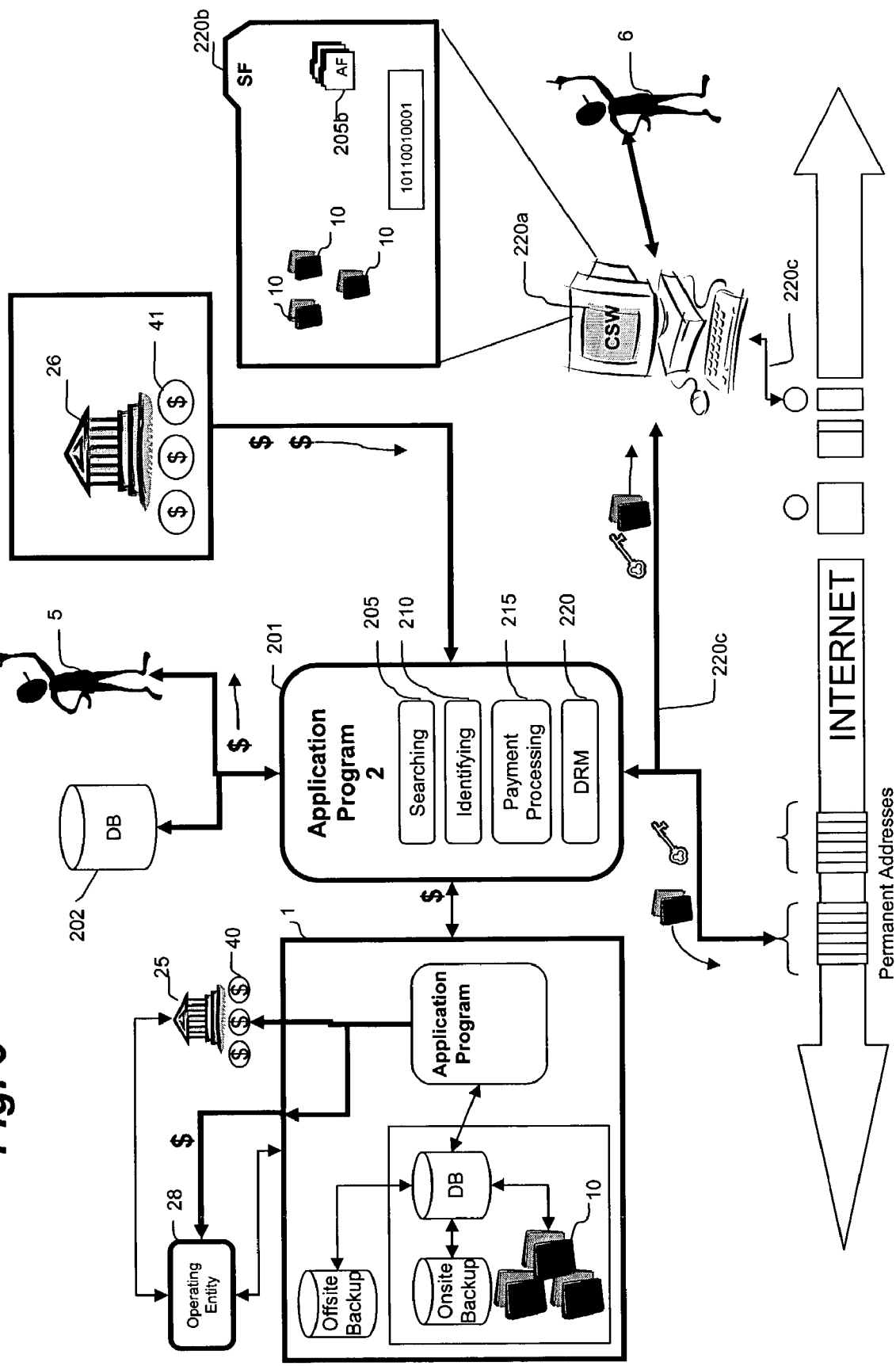
FIG. 5 is a schematic illustrating DRM and retrieval of archived IP with the added feature of a retrieval endowment fund.

Optionally, with reference to FIG. 5, if the specific IP 10 has funded retrieval 41, payment means 215 will request and obtain payment from a retrieval fund 26.

The DRM means 220 function to ensure that an IP-User's 6 access to the digital copy of the IP 10 is restricted to the access level that was paid for. For example, an IP-User 6 may have selected a preferred access level which is restricted to viewing rights to an article, but not to any printing rights, which are typically more expensive. Thus, the DRM means ensure that an IP Buyer 6b is only able to access a particular IP 10 to that level that was paid for. That IP-User then has access which may be exercised in accordance with the purchased rights, whether they are exercised online with the system 1 or locally as described later.

DRM means 220 are well known in the prior art, including those employed by Duet GP dba pressplay (www.pressplay.com) of New York. The DRM 220 of this embodiment of the IP-APS 200 would utilize similar technologies including providing custodial software (CSW) 220a to IP-User 6, requiring the IP-User 6 to register as a member with the system 200 and only providing the IP-User 6 access to specific local copies of IP 10, stored locally at the IP-User's computer in an encrypted secure folder 220b and which are only readable through the software interface 220a. The IP-User's 6 membership, through the CSW 220a, incorporates unique identification means such as a CPU ID, storage device ID or serial number to ensure that the IP-User could only operate one copy of the CSW 220a on one machine and thus avoid an opportunity for duplicate local copies. Other embodiments of a DRM 220 are possible and well known in the art, including maintaining an active connection 220c to the system 200 which tracks the amount of usage by the IP-User 6 and charges them accordingly.

The application program 201 coordinates all of the searching 205, identifying 210, payment 215 and DRM 220 means.

The application program 201 functions to keep track of the registration of the IP-User 6 using a database 202. Application programs 201 of this kind are well known in the prior art.

Preferably, the access to the IP and implementation of the searching means 205 incorporates an access file AF, 205b which assists in the retrieval of IP 10.

The access file 205b is an electronic file comprising some or all of a unique access file identification code (AFIC); a Permanent IP Identification Address (PIPA) being a specific IP or a way to reference and call up the IP 10; information defined by an IP-User 6 for that specific IP 10 to facilitate future reference, including some or all of user identity, keywords such as subject, project, person names, location, and date and time stamp; a collection of reviews and critiques; a collection of annotation overlays such as comments, highlights and bookmarks applied to that IP 10 by the IP-User 6, defined in terms of their relative positions in the IP 10; a collection of excerpts overlays such as excerpts and highlighted, extracted information from that IP by the IP-User 6; and collection of attachments such as text, audio, video or HTML files attached to that IP by the IP-User 6.

It can be seen that the access file 205b described above can be applied to facilitate storage and retrieval of IP 10 under other circumstances outside of the paradigm of a digital archive system, such as in a personal computer, PDA or main-frame server.

The annotation overlays can maintained locally at the IP-User's own computer or be contributed themselves as archived IP 10 with the appropriate discrete archival endowment 15 in accordance with the invention.

Having reference to FIGS. 6-7, screen-shots for several embodiments of a graphical user interface (GUI) for interacting with an access file 205b are shown. Each access file 205b contains the unique PIPA for the IP of interest, plus additional information such as user's identity and user-defined key words. It also contains value added information such as annotations, highlights, bookmarks, attachments, etc. applicable to the IP (which may be a 300-page research report), nonetheless the access file is a small and efficient file because it does not have to contain the sizeable IP itself.

This access file 205b, with its unique AFIC, can be stored in an IP-User's folder and/or be emailed to a recipient. It is itself a new secondary class of IP.

The access file 205b, whenever opened, accesses the specific referenced IP in the system 1 and applies the value-added information, before presenting the combined product to the IP-User. This access file can be added to and modified by another IP-User, and becomes another new access file with a new AFIC, and so on. A generation code component will be included in the AFIC to indicate the number of generations of added value that have been added to the access file. Note that the IP-User can upload the access file to the digital archive so that it can be accessed by the IP-User through another device or location or merely to ensure it is backed up. The file itself can be IP contributed to the archive and be subject to appropriate usage charges.

IP-Users of the system 1 are able to store the access files in folders and link each one to any number of projects, subjects, dates, people, etc. to facilitate future access.

This access file collection can be synchronized and updated amongst a myriad of internet access devices owned by the IP-User, including personal computers (PCs), personal digital assistants (PDA's) and WAP enabled cellular phones using software provided by the operating entity.

IP-Users are able to start an access file by adding in only partial information such as journal name, issue date, title or other key words, using drop down menus, keying or other methods while online or offline. Once logged onto the system 1, the custodial software CSW, 220a enables IP-Users to quickly download the rest of the information associated with the IP and add 'value-added' information such as annotation etc. to the resulting access file 205b.

The IP-User 6 may choose to submit their access file 205b to the system 1 for further archiving and for paid, or for free, access by others and thus becoming part of the valuable new class of secondary IP.

Secured Transfer of Access Rights and IP Copy

Figure 9:
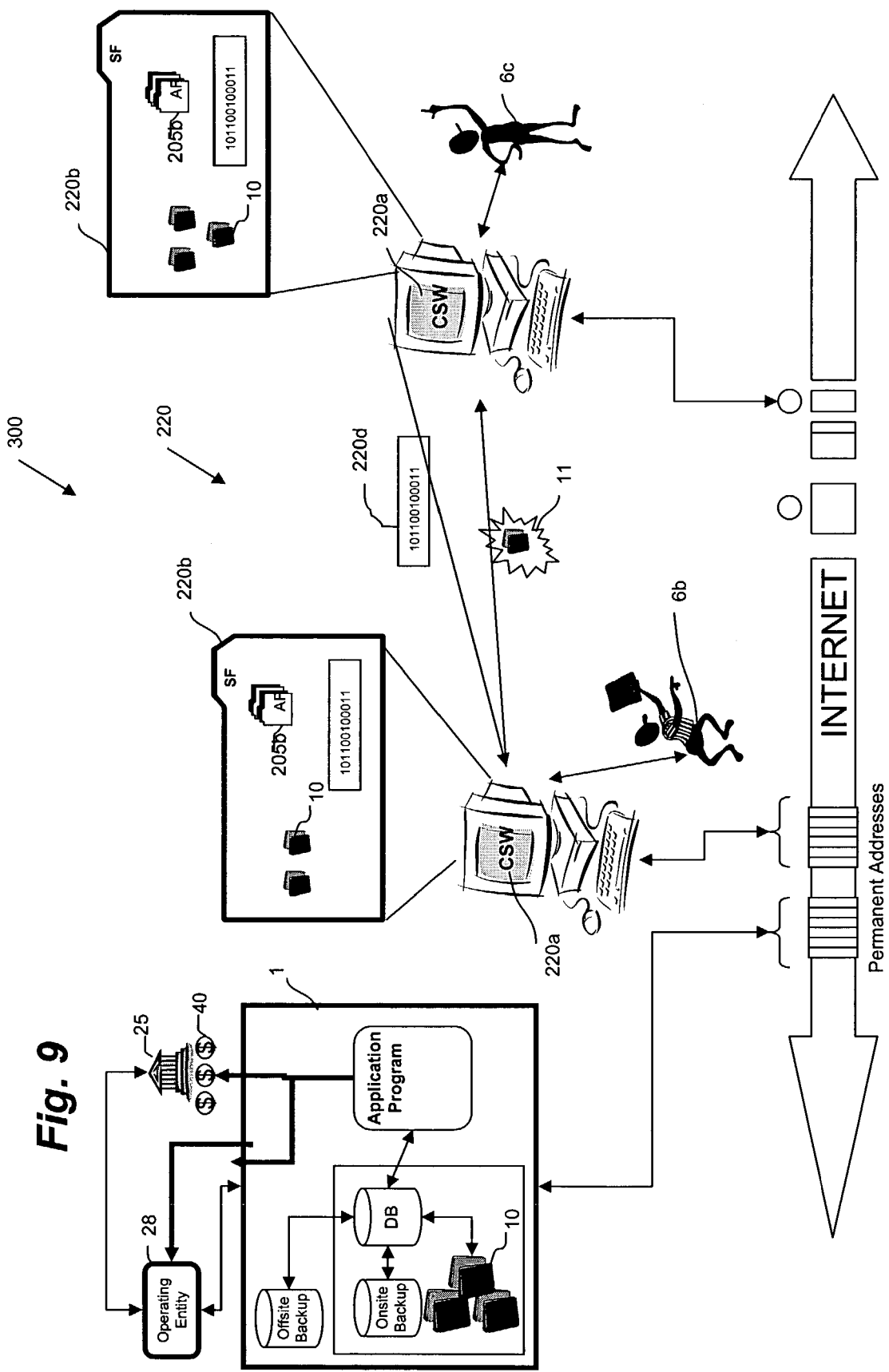
FIG. 9 is a schematic of the transfer of IP and associated access files between IP-Users.

Having reference to FIG. 9, one embodiment of an IP-Ownership Transfer System (IP-OTS) 300 is shown, for implementing a secured transfer of access rights to the digital IP 10, along with the transfer of a local copy of the IP 10, between IP-Users 6. In this way one IP-User 6b can transfer their purchased rights to the IP 10 to another IP-User 6c. The receiving IP-User then is able to implement the access rights of the first IP-User, while the first IP-User's rights expire. The first IP-User 6b may or may not receive some sort of compensation from the second IP-User 6c.

Digital rights management (DRM) means 220 are employed to prevent unauthorized copying of the IP 10 during the transfer process and to ensure that the second IP-User's 6c access to the digital copy of the IP 10 is restricted to the amount of access that was paid for by the first IP-User 6b. DRM means 220 are well known in the prior art, including those employed by Duet GP dba pressplay (www.pressplay.com) of New York.

The DRM 220 of this embodiment the IP-OTS 200 includes: providing custodial software (CSW) 220a to both IP-Users 6b, 6c, requiring both parties 6b, 6c to register as a member with the system 300, transmitting a unique user identifier 220d of the second IP-User 6c (based on the second IP-User's membership ID which incorporates the CPU ID or serial number) to the first IP-User's 6b CSW 220a, encrypting the local copy of IP 10 using the first IP-User's 6b CSW 220a and the identifier 220d so as to be decrypted only by the second IP-User's 6c CSW 220a, transmitting the encrypted IP 11 to the second IP-User 6c for accessing using the CSW 220a, deleting the local copy of IP 10 in the first IP-User's 6b secured folder, and updating the access rights information in the DRM 220 when IP-Users 6b and 6c next access the system 1.

Other embodiments of a DRM 220 are possible and well known in the art.

IP Publishing and Distribution:

To enable IP-Owners to publish and distribute the IP they have archived in the system to IP-Members, a publishing and distribution embodiment of the system allows an IP-Owner to license, assign or transfer the copyrights for the specific IP to the operating entity for publication and distribution using the business and technical infrastructure of the operating entity. The IP-Owner can specify the monetary price level, which includes any retrieval costs that individual IP-members must pay to access the published IP.

Preferably, this publishing and distribution embodiment allows for the IP-Owner to review and commit to the commercial terms and conditions for the publication and distribution of such copyright-licensed, copyright-assigned or copyright-transferred IP. More preferably, the operating entity will provide guidelines for the basic cost associated with the publication/retrieval of an IP, in relation to its type (text, audio, video . . . ), size (kilobytes, megabytes . . . ) and selected access fee, prior to the IP-Owner committing to the publication and distribution of the IP.

This embodiment of the system provides for the IP-Owner Member to authorize the organization and execution of specific and general marketing/promotion by the operating entity, in connection with the publication and distribution of such assigned or licensed IP. Appropriate digital rights management means would be employed to ensure that the publication and distribution is only to the extent authorized by the IP-Owner. Preferably such DRM means allow the IP-Owner to specify levels of access, or access levels, for each publication (such as viewing, annotating (including underlining, highlighting, commenting and attaching other documents), printing, excerpting, copying, reprinting, linking, applicable to single-access, multiple-access, time-based-access, elapse-time-access, perpetual or other accesses). More preferably, the DRM means allow the IP-Owner to specify the access level to be granted, and price level to be charged, to one or more lists of specific individuals, groups or organization and the security and identification system required to administer such controlled accesses. This embodiment of the system provides also allows the IP-Owner to specify specific discounts or price adjustments to be granted to one or more lists of specific individuals, groups or organization and the security and identification system required to administer such controlled accesses.

More preferably, the publishing and distribution system further provides a process to: convert the desired monetary price levels to corresponding number of purchase credit, points or similar units of value, such as the IP-Points, that are defined by the operating entity; to create, collect maintain and/or the prior sales, review comments, popularity rating, credibility rating and other information applicable to an IP-Owner, to allow both the operating entity and the IP-Owner Member to monitor the access traffic and financial performance of each IP or set of IP published (a performance tracking system); to allow an IP-Owner to adjust the price level (e.g. access fee) for each published IP, in response to the data provided by the performance tracking system (a dynamic pricing system); to allow an IP-Owner to set up a member account in the community to accept net proceeds of the publications, as a transaction, and into the account monetary amount balance purchase credits, points or similar units of value that are defined by the operating entity; to allow the IP-Owner to purchase. commercial or captive (in-house) insurance against potential fraud related to online payments by credit cards or other means (fraud insurance system); to provide an escrow system to retain the net proceeds from each transaction into escrow for a period of time as a safeguard against misrepresentations of copyright ownerships and revenue sharing arrangement amongst interested parties (proceeds escrow system); to provide an ownership title insurance system which enables the IP-Owner to purchase insurance applicable against partial or full potential costs and damages arising out of any misrepresented or disputed ownership of IP submitted in the archive system; and to provide a threshold remittance system so as to accumulate net proceeds for each IP-Owner Member, after escrow requirement, and to remit in lump sum such accumulated fund upon it reaching certain threshold amount or certain administrative time period.

Additional Embodiments

Access by Subscription:

To enable IP-Users 6 to efficiently access a set of IP 10 in the archival system 1, without having to pay a series of individual retrieval fees, the system 1 aggregates some of the archived IP into categories so as to be accessible by the IP-User through paying periodically such as through a daily, monthly, quarterly, or yearly subscription fee. More preferably, the system assigns individual or groups of IP into one of several subject categories, and one of several subscription price sub-categories such as basic, plus, or premium. The IP-Owner elects which category into which to place their IP and receive a pro-rata revenue therefrom. The system's e-commerce means collects and record subscription fees paid by IP-User who opted for subscription service, an IP-User-subscriber, and aggregates the fees for specific subject and price category combinations. The system monitors and records all IP accessed by IP-User-subscribers and the associated information on subject and price category combination, and computes, for each subject and price combination, the individual, median and average costs related to the retrieval of the IP accessed by IP-User-subscribers. Further, the system computes, for each subject and price combination, the individual, median and average net revenue or proceeds related to the retrieval of the IP accessed by IP-user-subscribers. The individual, median or average net proceeds to be used for each subject and price combination is chosen using clear and fair criteria. The net proceeds in each subject and price combination are proportionately allocated, by fair and reasonable logic and formula defined by the management, to IP-Owner who had submitted the IP. Further, the allocated net proceeds are distributed, periodically and upon it reaching certain threshold minimum amount, to the applicable IP-Owner on a pro-rata basis. The IP-Owner designates individual or groups of IP to be accessible by subscription, and to specify one of the applicable subject and price combinations. Should the IP-User choose to access the archived IP in the Community by subscription, instead of to each IP individually, they sign up and pay the applicable subscription fee.

Access File Enhancements:

To enable IP-Members to efficiently use the access file 205b, the system ensures that the excerpt overlays, individually and collectively, comply with the "fair use" guidelines of applicable copyright laws. The IP-Members are permitted to view the key information stored in an access file, including specifically the annotation overlays and excerpts overlays, and to index and search a collection of access files and present the search results for further actions. Other enhancements include options to sort access files by one or more criteria, to organize access files into folders, and to send access files over a communications network to other IP-Members. The IP-Members can create, link and track successive versions or generations of access files by adding incremental information for subsequent saving to a new access file.

In due course, an IP-Member activates each access file to access an associated IP, applies the collection annotation overlays to the IP which is accessed; reviews the annotated IP; adds a further collection of annotation overlays to the annotated IP; and stores the combined collections of annotation overlays in a new access file, if desired.

The IP-Members input partial key information related to a specific IP into devices such as PDA's or laptop/notebook computers, and upon communication via distributed network, such as Internet, with the Community, acquire the relevant full PIPA for further actions; Access file information stored on any or all of PDA's, smart cellular telephones, laptop/notebook computer desktop personal computers can be updated, synchronized, and can access online backup with the community.

The IP-Members can create an online back-up copy of their collections of access files in the digital archive system and retrieve such back-up copies.

Redundancy System

To encourage further archiving of valuable IP in additional databases, and in turn to create additional redundancy against potential loss, there is provided secondary and tertiary redundancy in the system. Specific IP is organized and monitored for inclusion in additional authorized sites and databases other than those of the community. Such additional sites must have a capability and a capacity for archival of IP. These secondary and tertiary archival copies of specific IP are monitored, organized and displayed in a system beyond the initial or primary archived copy, any onsite and/or offsite backup copies and any disaster recovery copies. Specific portions of the proceeds from the publication of a specific IP in the Community is allocated to fund or assist in funding such secondary and tertiary redundant archival. Alternately, excess or surplus funds available from the individual or pooled permanent IP archival endowment fund, permanent IP retrieval endowment fund and IP Charitable Foundations are allocated to funding. Whether specific IP should be placed in redundant archival, IP is assessed and assigned classifications for determining a desired redundancy level based on a consistent set of specified criteria. The condition of the primary copy archived within the community is monitored and successive levels of redundant copies or backups are as activated as necessary according to a predefined protocol. Further, to ensure that the copies are equivalent to the primary IP, a system is proved to compute, store and periodically compare a digital hash or other measured or calculated characteristics of the various copies of specific archived IP and applications can be invoked to repair any damage, deletion or virus infection.

Archival Sustainability Indices:

To allow for quick and easy review of the financial and technical conditions of a specific IP, an embodiment of the system, through the use of one or more indices, displays such information including the number of back-up copies, technical integrity of these copies, the financial health of these copies measured in terms of quality of future year funding by the archival endowment fund, and flag the trouble spots with appropriate symbols, comments or equivalent. Preferably, the system can clearly display these indices in tabular or graphical format, or similar to the gauges in a car dashboard, for easy recognition and monitoring by interest parties, including the relevant IP-Owner over the Internet or other communication system. More preferably, the system will initiate and monitor the technical repair of the flagged archived IP, and receive and aggregate funds from diverse sources such as charitable foundations and government agencies, and allocate these funds according to predefined criteria set to restore and enhance the financial health of flagged archived IP.

IP-Member Name Registration:

To enable IP-Members to be identified in the system, and to other IP-Members, with a unique name the system provides for each IP-Member to register a unique name to be used for identification of submitted IP. Optionally, where multiple IP-Members desire the same unique name, the operating entity can decide which IP-Owner will be able to register under that name based on pre-set criteria (including registered trademark or corporate name registrations that may be held by an IP-Owner). Alternatively, where the unique name is desired by multiple IP-Members the name can be auctioned off with the proceeds of such sale directed to one or more charitable foundations that will fund the archival or retrieval, or both, of IP related to charitable and humanitarian causes.

Authorized Service Agents:

To enable an operating entity of the system to manage rapid growth of the system, third parties can be appointed by the operating entity as Authorized Service Agents and be given some of the responsibilities related to the management of the system. Examples of responsibilities that may be given to an Authorized Service Agent include: format conversion, editing, metadata preparation (such as keywords, summary and excerpts), submission and related services for IP's to be submitted to the system, printing, transference to various storage media, photo-finishing, binding, packaging, delivery of IP products and services related to the Community, and the development, marketing and delivery of products and services of the Community to existing and potential members of the Community such as journal publishers, conference organizers, corporations, and government agencies.

Operating Entity—Affiliates and Licensees:

The digital archive system further enables IP-Owners 5 of collections of IP, such as corporations, private collections and libraries, to participate in the benefits and efficiency of the system 1 and the community. An operating entity 28 allows these IP-Owners 5 to join as affiliates or licensees. The system of such an embodiment inspects, advises and supervises, or more generally controls, the computer and communication system design and installation, of potential affiliates or licensees, to achieve the archival, back-up and disaster recovery capabilities. Further the system controls the financial system design and installation of potential affiliates or licensees so as to ensure and achieve the relevant essential components necessary for the desired permanent archival and retrieval capabilities. A process for the authorization, mandate or licensing of specific affiliates or licensees ensures that they meet and maintain minimum required operational and financial standards and commitments. As a further safeguard, one can organize diverse content specialization by individual affiliates or licensees and provide for multiple archiving of each specific IP in multiple environments, to further ensure permanent archival of those IP. Means are provided for the connection, coordination and management of the communication between the various hardware and software systems of the affiliate or licensees and the community's digital archive system; and for the management, co-management or supervision of the management of the archival and retrieval endowment funds and IP Charitable foundation funds of the affiliates or licensees.

Distributing Partners

In another embodiment the digital archive system 1 can distribute IP 10 to third party partners who are more effectively placed for distribution. Examples of these third parties include broadcasters (radio and television), publishers (newspaper, magazines, journals, newsletters, directories, databases), and exhibitors (museums, libraries, seminars, trade shows, conventions and conferences). Preferably this embodiment of the system allows for the third party distributor to join the community of IP-Members and agree to abide with the ethical and operational guidelines thereof and further to accept initial and sustaining membership fees from the third party distributor. Note that the distribution varies by the nature of the third party; the publisher publishes, the broadcaster delivers via their chosen media and exhibitors display the IP.

For delivery to the third parties, the specific IP is enclosed within a separate digital security envelope so as to allow authorized storage of the envelope and content in the third party distributor's computer and server system. This envelope can be opened efficiently, and only upon authentication of the third party distributor's identity using secured digital certificate or equivalent security measures. The third party distributors review and commit to commercial terms for using a specific IP or a group of specific IP for distribution, including the stipulation of security deposit. The system accepts monetary security deposit from the third party distributors required for the specific IP. It is additionally useful to assess the size, quality and value of the audience of the third party distributors defined over specific time periods most relevant to the time of use of the specific IP. The system monitors and records each time the digital envelope is opened and the IP is accessed and distributed, preferably using the custodial software CSW and to accumulate the aggregate number of authorized distributions for that specific IP over defined periods of time whether it be daily, weekly, monthly or over some other period. From this information, one can compute and construct a database of frequency, audience information and identity of IP for collection, in a utilization database, used in authorized broadcasting, publishing or exhibition over a defined period of time. The information from the utilization database is transmitted to the Community at defined time intervals. The commerce means or system accepts payments from the third party distributors at defined time intervals according to agreement. Preferably, the operating entity or system provides technical support and client relationship support to the third party distributors. Analysis of the performance of the distributor includes a determination of: for broadcasters, assess the size, quality and value of the audience of the IP-broadcaster-member defined over specific time periods most relevant to the time of use of the specific IP; for publishers, assess the size, quality and value of the readership and audience of the IP-publisher-member defined over specific time periods most relevant to the time of use of the specific IP; and for exhibitors, authorize, monitor, record and authenticate the actual number of audience/visitors and the revenue collected, including value of promotional initiatives, for each exhibition.

Reference Partners:

To allow IP-Members, such as libraries, museums, archives and similar collection, interpretation and access-granting organizations, to partner with the operating entity 28 to provide improved content of, and access to, the archived IP 10 in archival system 1, the system 1 can: provide for the libraries, museums, archives and similar collection, interpretation and access-granting organizations to join the Community as "IP-reference-partner", and agree to abide with the ethical and operational guidelines of the Community. The community receives initial and sustaining membership fees from the IP-reference-partner and provides software to the IP-reverence-partner to facilitate participation as an IP-reference-member. The IP-reference-member submits a copy of an encrypted digital certificate or a stipulated equivalent security instrument to be used to affirm the identity of the member. Procedures are applied to verify the identity of the reference partner. The submitted security instrument is used by the IP-reference-member to register as the official source of future IP submitted.

There is an opportunity for the IP-reference-partner to recommend IP that is available in the public domain or IP that has with free copyright access, including certain IP worthy of permanent archival. According, the system must assess the quantum of the discrete archival endowment required for the recommended IP. The community would evaluate whether the recommended IP is eligible for any sponsorship by any charitable foundations or operational surplus and decide whether to archive the recommended IP. Further, the community determines the minimum access or retrieval fee appropriate for these IP for which there are no costs of copyright.

The IP-reference-partner can sponsor and submit the IP as recommended above, including in accordance with the principles of the present invention including: allowing the IP-reference-member to submit a digital version of the IP to be archived, to contribute the discrete archival endowment required for the submitted IP after incorporating any other available funding accepted by the community. Further, the community determines the minimum retrieval fee appropriate for these IP for which there is no cost of copyright and pays the IP-reference-member, on an ongoing basis, a percentage of the retrieval fees to encourage such continuing and future sponsorship. The IP-reference-partner can become a focal point or a preferred reference source for specific subjects, including: for the organization of a reference database of access files and links of IP archived in the community related to that specified subject and further to add to that reference database, additional links to IP stored in other archives or databases related to that specified subject. Means are provided for identifying and recording when a user, via the IP-reference-member's reference database, accesses an archived IP in the community; to accumulate the access fees collected from such user access; and to pay to the IP-reference-member a referral fee based on certain percentage of the accumulated access fees, on a periodic basis and upon reaching certain threshold amounts.

Educator Partners:

Similarly, the digital archive system contemplates educator partner IP-Members 5, such as individuals and organizations, including governments and educational organizations, to partner with the operating entity 28 to pay for and facilitate access to specific IP 10 stored in the archival system 1. Such an educator partners join as Education Organization Member (EOM) and establish an EOM account with the Community and deposit funds into the account. The EOM can authorize access to one or more lists of educators, students IP-Owners and/or IP Publishers, or to specified subject matters and specific IP's. For example, the EOM can specify one or more sets of criteria and conditions under which a student may access one or more IP's archived in the community with the associated payment being made by the EOM. The community monitors and manages these authorized accesses; maintains a database of these accesses by subject, educator, publisher and similar criteria; analyses the access and accounting information; and reports the results of the analyses to the community and to the EOM.

Marketing:

To enable an IP-Owner to indicate their membership with the Community of IP-members, the operating entity will provide means for the IP-Owner to use the logo or trademark or jingle of the Community on printed publication or in content published in a distributed network such as intranet, Internet or World Wide Web, radio broadcasts and television broadcasts, to indicate the value-added feature that designated content are permanently accessible in the Community. Such means can simply be an additional step wherein the application program 20, prior to the IP-Owner being logged out 155 (FIG. 3) after a successful archive 176, provides the option to upload a digital copy of the Community's logo, trademark or jingle to the IP-Owner's computer, and provides the a list of authorized uses to which the IP-Owner may put the logo/trademark/jingle.

Further, it can be advantageous to coordinate the marketing efforts of IP-Owners which can ensure consistency, graphics, content and frequency guidelines for co-marketing efforts. Guidelines can be; provided to define minimum, proportional and optimum co-marketing requirement for each IP Owner Member who publishes in the Community. For the community it is also advantageous to monitor the compliance of participants in the co-marketing efforts. There can be assistance provided in the form of funds earmarked for specific co-marketing efforts. In a co-marketing effort, one can solicit and engage third party co-sponsors.

Exchange Partnership with Third Party Loyalty Programs:

To establish an exchange partnership with third party customer loyalty programs (e.g. Air Miles (TM of AIR MILES International Trading B.V.), AAdvantage (TM of American Airlines, Inc.), Visa Reward (TM of Visa International), etc.), one embodiment of the archival system and the operating entity can: define the values of the "IP-Points" in the various contexts of: IP-Member purchase, sale to other loyalty programs, exchange with other loyalty programs, and transaction-volume dependence in each case; identify, evaluate and select appropriate third party customer loyalty program for partnership or affiliation; define the relative value of the points or other unit of credit of the partner program, in relations to IP-Points, for various transaction volumes; define the appropriate ratio of exchange with each partner program, for various transaction volumes; define the appropriate monetary value at which the Community will be paid to accept the partner's points or other units of credit, for exchange into IP-Points; define the monetary value at which the partner can purchase IP-Points from the Community, for various transaction volumes; and receive monetary payments; to issue, exchange and redeem IP-Points; and to monitor and manage the overall performance of this IP-Points Partner Program; and co-ordinate joint or cross over marketing efforts with the partner.

Exchange Partnership with Third Party Merchants:

To enable the Community to allow third party merchants to use IP-Points for affiliate loyalty programs (similar to Aeroplan™ (trademark of Air Canada, Canada) points for FTD-Flowers™ customers), one embodiment of the archival system and the operating entity adopts additional features including: defining the values of the "IP-Points" in the various contexts of affiliate merchant loyalty programs, for various transaction volumes; identifying, evaluating and selecting appropriate merchants for affiliation; receiving monetary payments, issue and redeem IP-Points, and monitor and manage the overall performance of this IP-Points Merchant Program; and co-ordinate joint or cross over marketing efforts with the partner.

Securitization

Figure 10:
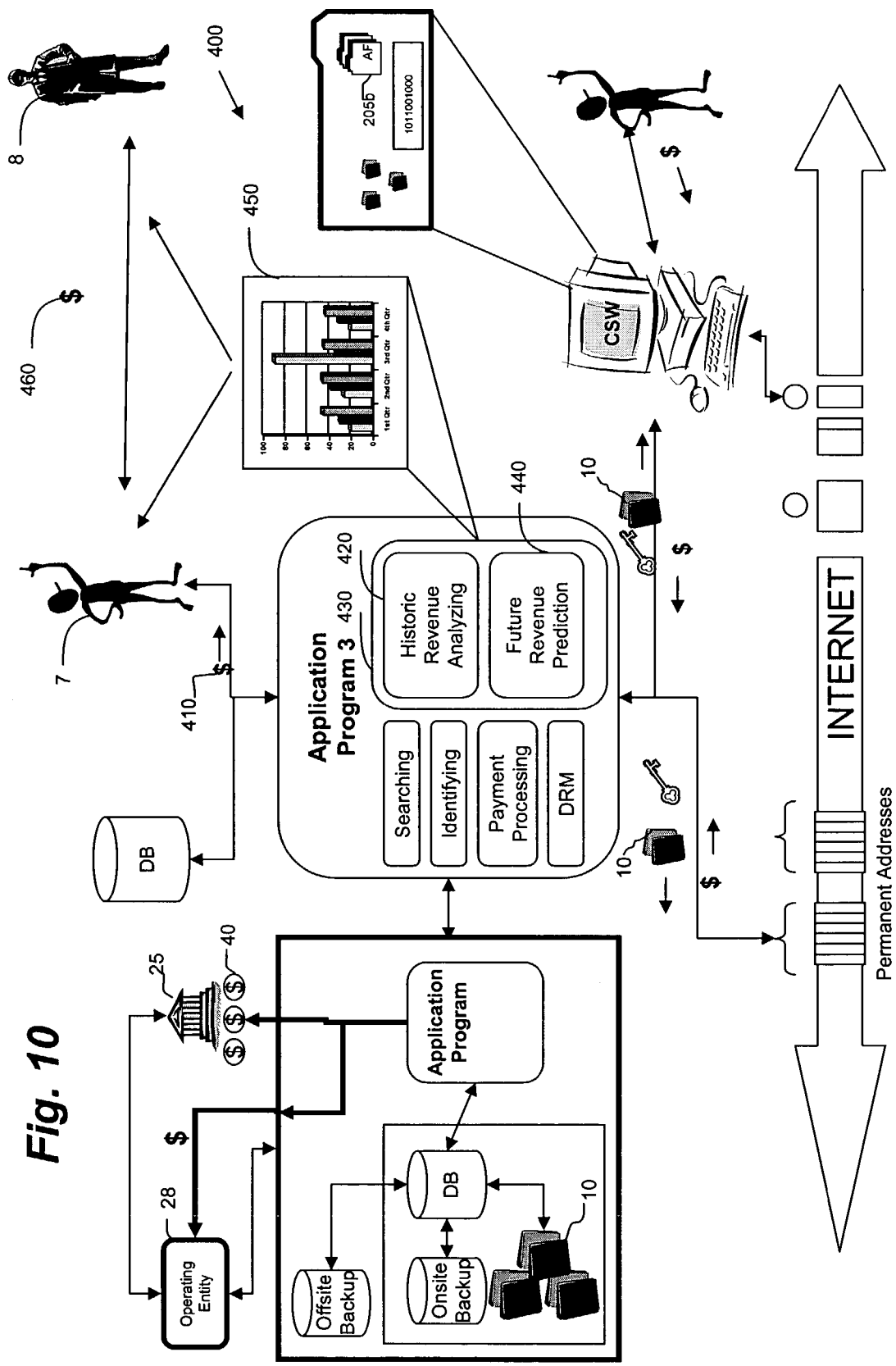
FIG. 10 is a schematic of a system for determining a basis for securitization of archived IP.

Having reference to FIG. 10, one embodiment of a financial securitization system 400 is shown which valuates a revenue stream 410 of access fees associated with access to an archived IP 10 by a plurality of IP-Users 6, and thus can be used as an indicator of the value of the IP 10 as an asset. The securitization system 400 is shown to be part of the application program 20 of the archival system 1, and includes means 420 to analyze the historical stream of net revenues generated by a specific IP 10 for the IP-Owner 5, means to analyze the quality of the revenue stream 410 in terms of seasonality, growth, decline, consistency, expected life, etc 430, and means to forecast the future revenue stream (with means to assign appropriate risk and quality profile to the future revenue stream) 440. The securitization system analyzes the revenue stream 410 and generates reports 450. An IP-Owner 5 can offer or otherwise use those reports 450 when seeking and obtaining financing 460 from a third party 8 and when pledging the revenue stream 410 as security or collateral.

The financial securitization system 400 has addition features, for both historic and future revenue streams, including: calculating discounted cash flows using appropriate discount factors; determining capitalized values of discounted cash flows of that specific IP; organizing and registering the ownership of such capitalized value by interested parties; transacting the purchase and sale of the ownership of such capitalized value by interested parties; defining and collecting a reasonable commission for such transaction; and recording and analyzing information related to these transactions.

It can be seen that the securitization system 400 set forth above can be applied to revenue streams 410 from aggregates or groups of IP. Further, valuable IP can be identified and a financial, management and information system can be applied to create venture capital or some other investment funding vehicle for the archival IP. The aggregated IP and revenue streams are surveyed for the identification of areas of archived IP that potentially create significant value to their users. Information is assembled on financial viability of previously archived and published IP in the identified areas into a knowledge base. The knowledge base is analyzed to create investment guidelines for venture capital and other funding for the archival and publishing of IP in identified area. Investments can be organized, pooled, coordinated, and managed for the archival and publishing of selected IP.

Physical Archiving

It can be seen that the archival methodology set forth in FIG. 1 can be applied to discrete contributions of physical objects, being tangible representations of IP, such contributions being made by IP-Owners. IP-Owners can contribute an object to an operating entity, together with a financial contribution of a predetermined quantum which, when placed in an archival endowment fund, funds the operating entity's archiving of the object for an archival period. It is recognized that without the benefit of the Moore effect with digital archiving, the quantum of the endowment for physical archival would typically be more generously conservative. There is an analogous retrieval function to that as set forth in FIG. 4 wherein the objects are available for access by IP-Members such as through an exhibition; the access cost of which must be funded separately from funds flowing from the archival endowment fund. There is a similar analogy between a retrieval endowment fund and an access endowment fund for funding access to the physical objects. Note that transfer of ownership and access rights are likewise enabled, however the ability to copy is understandably limited.

Facility Utility Enhancement

In an additional embodiment made possible through the use of the digital archiving system, better controls can be maintained over the presentations of copyrighted IP or even create sources of revenue for IP-Owners of previously underutilized IP.

Exhibition facilities like movie theaters typically have low capacity-utilization rates resulting from constraints imposed by their traditional distribution and promotion systems. The system enables decentralized distribution of exhibition material such as movies, documentaries, educational material and home movies to be exhibited in these facilities to new cross-sections of audience, thereby improving the capacity-utilization and the profitability of movie theaters. The system mobilizes the audience and interested stakeholders to choose and organize what IP is to be shown at various underutilized exhibition facilities. The system provides for DRM, revenue sharing and joint marketing. Extensions of the system are applicable to convention centers, hotel conference facilities, museums, lecture theaters, classrooms, community centers, sports stadium, sports arenas and gymnasiums. Further, an additional embodiment enables addition of supplemental titles and access information to movies and similar materials to further facilitate user's access to these materials.

More particularly, movie theaters suffer from low capacity-utilization that reduces profitability. The use of multiple screens within one facility ('multiplex') has helped improve utilization to some extent. Traditional distribution and promotions rely heavily on promotion of new releases to fill seats. However, within days or weeks after the release, the audience level for an individual movie often drop well below 'per-show' operational breakeven points. Sporadic interleaved use of the theater space for corporate seminars, satellite-fed special broadcasts and similar events helps to improve utilization, but the impact on the bottom line is limited. Additionally, the introduction of Video Cassette Recorders (VCR's) enabled television viewers to record TV programs for viewing later at the viewer's convenience, free from the programming schedule constrains of TV stations and networks. This viewer's-choice function is now further simplified and enhanced by digital hard disc storage based products such as ReplayTV™ and TiVo™.

The distribution of movies through rental outlets of videocassette and higher quality Digital Video Discs (DVD's) has worked well to provide film producers additional residual revenues from movies. Similarly, pay-per-view options available from some digital cable system operators and the new Video On Demand (VOD) system offer similar viewer's-choice functions without the need to go to and from the video rental outlets.

However there are disadvantages and lost opportunities associated with the current presentation streams. Currently, once the movie has been shown in first and second runs in theaters, viewing VCR's and DVD's at home are the only means to watch a movie that the viewers want, when they want it. A similar viewer's-choice option to watch movies at a later time in movie theaters does not exist. Further, most home televisions are not sufficiently equipped to benefit from the added features of surround-sound and added video definitions. Home system upgrades are often too expensive and rapidly outdated. In addition, movie theaters often offer an enhanced sensory and social experience when compared to home television viewing. Additionally movies, documentary films, television shows or similar programs are typically identified by movie titles and credits displayed at the start of the program. A high proportion of television viewers start watching these programs only after the initial film title and credits have been shown. It is often difficult for them to identify the title of a program or to find it later for viewing again. Many, if given the means, would want to watch these programs again. Many others would also desire the ability to reliably identify, search, locate and refer to the programs at a later time.

Accordingly, alone or in combination with the digital archival system as set forth above, an integrated capacity-utilization enhancement system is provided for increasing the capacity-utilization of exhibition facilities and to increase revenues for IP including movies and documentary films, in part by assembling, coordinating and authorizing exhibitions of IP and live events in exhibition facilities.

Typically, a movie theater designates portions of exhibition space, such as one of several viewing rooms, available for premium showing for specified pricing and conditions. A customer books the premium showing space. The customer books a viewing of the IP in the booked space. The DRM will require certain arrangements be made to ensure that the viewing does not violate any licenses and that the proper IP-Owner is compensated. Accordingly, approaches include having the customer sponsor and pay for the costs of the premium showing or to have the customer partner with the movie theater to share the revenue with the IP-Owner.

Accordingly, a facility availability database system stores and manages information relating to the availability of a facility and its facility operator. A DRM system stores and manages information relating to specific commercial IP, its IP-Owners and usage terms including revenue or royalties. A booking system is required for storing and managing the information database relating to stakeholders, who assume the financial burden, and individuals forming an audience. A system is required for audience acquisition, more particularly for contacting individuals targeted by the stakeholder for viewing the IP. Finally, a revenue determination, collection, accounting and royalty distribution system is an integral part of the DRM for ensuring that the stakeholder, facilities operator and IP-Owner's receive proper compensation. Stakeholders can be the IP-Owner, the facility operator, the customer, or a combination of the IP-Owner and a person or persons having nexus with the audience. IP are typically audio-visual media and more particularly, movies, documentary films, educational films or promotional films and broadcasts of live and recorded events.

A communications network is provided and for interfacing the facility availability system, rights management system, booking system, audience acquisition system and revenue system. All of these systems are integrated with the digital rights management system however they are not necessarily physically superimposed hardware systems.

Practically, to ensure that an audience having the greatest numbers attend the viewing, a movie theater or the customer can list and advertise upcoming viewings for broadcast by the system, such as through a website or other associated media, or an organizing email campaign can be distributed to list of friends, interested parties, or specific groups interested in certain movies or certain genres of movies. The specific groups can register to be notified of upcoming viewings, such notifications preferably being targeted by geographical proximity such as through postal codes provided on registration. The system would enable the assembly, organization and presentation of information relating to the availability and the viewing of IP, live events, and available exhibition space, all of which can be accomplished through communication networks.

A movie theater can provide the movie to be exhibited, with the system collecting appropriate royalty payments for submission to copyright holders.

In the case of managing the digital rights, a customer can bring from a video rental outlet or from his own collection, a commercial DVD, Video Cassette of a movie to be exhibited to be shown at the booked space. Linking the specific IP with the system ensures that the viewing is authorized, copyright protection is acknowledged and royalty payments can be appropriately collected for submission to the IP-Owners. One approach is for the movie theater to collect, record and account for revenues associated with each exhibition and submit periodically to the system for portioned distribution to all stakeholders, including movie theater owners, the sponsoring customers, the system and the IP-Owners.

The enhancement system can be expanded into viewing of customer created material, with appropriate safe guards such as guidelines for permitted content, legal deposits, requirement of customer affidavit declaring copyright ownerships and appropriateness of content for public or private viewing, etc. The customer would be a member of the system and the IP would be archived for retrieval by the customer or the movie theatre for example. To ensure compliance, a member movie theater would authorized full access to the operations and the accounting records by the operating entity for the system for auditing and performance improvement purposes.

The DRM, revenue processing and accounting or audit systems comprise of one or more independent or inter-related hardware and software systems including fixed or mobile kiosks or handheld systems to process and validate printed entry tickets, including bar-code tickets, or virtual entry tickets comprising digitally transmitted names and associated confirmation codes.

It is clear that the facilities in the above system can be extended from movie theaters to include multiplex theaters, convention centers, hotel conference facilities, museums, lecture theaters, classrooms, community centers, sports stadium, sports arenas and gymnasiums. Further, the material to be exhibited can be extended from commercial movies to other IP content including television programs, amateur movies or video, documentaries movies or video, and live events such as lectures, educational seminars, informational exhibitions, artistic exhibitions, artistic performances, sports, artistic and intellectual competitions, and also corporate and community events. While the management is related to a digital version archived with the system and for which the IP-Owner is known, the actual medium of transmission of the IP is at the discretion of the IP-Users and the ability of the facility. Accordingly, the range of medium can be extended from celluloid films, to digital and analogue magnetic tapes, optical tapes and disks, analogue and digital transmission via cable or telephone lines, to electronic, optical and microwave transmissions.

With IP obtained digitally from the system, the title of a movie, documentary, educational videos or similar audiovisual programs can be superimposed and/or appended to various locations throughout the IP such as (i) near the end of the main section of the program, typically just before, during and/or after the movie credits (incremental to the traditional inclusion at the start of the program), or (ii) during the main body of the program. This supplementary information can be presented in the form of foreground or background watermarks. Similarly, information related to how the program may be accessed again: via video rental, pay per view, TV network broadcast, Internet, private screening, public screening etc., is similarly superimposed or appended to the IP. Additional useful information such as corporate logos, physical addresses, telephone numbers, website addresses or similar information of the selected providers of products and services can be added. Such superadded information can be added during the actual creation of the celluloid film prints, magnetic video tapes or disks, optical disks or any other storage/distribution/access medium; or by modifying the medium by editing and splicing to include the additional information; or by transferring the program to a new medium with provisions for the addition of the additional information. Preferably, this information is added before the initial or subsequent broadcast or exhibition of the program. Extension of the system will allow similar application to books, journals, magazines, and to conventions proceedings, seminars, plays and concerts.

Equally, once the IP-Owners are known, the source of the IP is assured and a DRM system is in place the system can be applied to broadcast over network means.

These objectives and embodiments are implemented in a facilities management system which is an integrated system of hardware and software systems (the "Integrated Capacity-utilization Enhancement System", "ICUES") to increase capacity-utilization of exhibition facilities and to increase revenues for IP, by assembling, coordinating and authorizing exhibitions of Intellectual Properties Content ('IPC') including live events in exhibition facilities. Examples of IPC comprise of one or more of commercial movies or videos, documentary movies or videos, amateur movies or video.

Available IPC, including live events, are assembled, organized and presented via suitable communication networks. Such networks include one or more of Internet, World Wide Web, Intranet, Virtual Private Network, private or shared optical, cable, microwave or telephone network, plus physical delivery/transfer systems using celluloid films, digital and analogue magnetic tapes, optical tapes and optical disks.

Correspondingly, information on available exhibition space is also assembled, organized and presented via the communication networks.

Having access to both the availability of the exhibition space and available IPC, customers can arrange exhibition of the specific IPC at a specific exhibition facility at a specific time at specific prices and terms.

Integral to IP rights management a system is employed to verify and enforce the management of copyright issues for the exhibited IPC. Accordingly, a system is also provided for collecting revenues and distributing proceeds. Advantageously, audience information and demographics can also be collected. To control the management of copyright issues, means are provided for inspecting and auditing the operations and the accounting records of the participating exhibition facilities.

Examples of exhibition facilities include one or more of movie theaters, multiplex theaters, convention centers, hotel conference facilities, museums, lecture theaters, classrooms, community centers, sports stadium, sports arenas and gymnasiums. Live events include one or more of lectures, educational seminars, informational exhibitions, artistic exhibitions, artistic performances, sports, artistic and intellectual competitions, and also corporate and community events.

It is anticipated that the IPC is assembled, organized and presented using one or more independent and/or inter-related hardware and software systems including computers and servers having input and output interfaces. Onsite and offsite mirror servers, backup systems, offsite disaster recovery systems safeguard the IPC. A communication transmission and receiving system and software system includes conventional means such as: a database management system, a data encryption system, a payment receipt and accounting system, a proceeds disbursement system; and an IP rights management system.

The copyright-management, revenue/proceeds processing and accounting/audit systems further include fixed and mobile kiosks or handheld systems to process and validate entry tickets. Tickets may include physical or printed tickets such as bar-code tickets or virtual entry tickets such as digitally transmitted names and associated confirmation codes.

For controlling the facilities management system, real-time or periodic transmissions of audience and revenue information are provided to the ICUES central system.

After initial broadcasts or performances, one can improve subsequent access by an audience or customers to IPC after any initial broadcasts or performances through better communication of access information. To do so, IPC and any desired contact information is received and the desired information, in the desired format, including IPC title, access information and corporate logos is added to the IPC by superimposing or appending the generated information to a desired location within the IPC. The information related to the processed IPC is stored for convenient review and retrieval.

The ICUES is further enhanced by the ability of the owners of the IPC, the IPC-Owners to submit the IPC, or a copy thereof, to a permanent or transient archival and retrieval system. Additionally, the IPC-Owners can submit the IPC, or a copy thereof, to a proprietary publishing and marketing system. There should also be the means to return the IPC to its appropriate IPC-Owner. The IPC information is preferably organized and managed a centralized data management system such as the digital archive system above.

EXAMPLE IMPLEMENTATIONS

Corporate Reports:

Publicly listed companies are required by securities regulations to publish annual and quarterly reports to their shareholders and prescribed information circulars to potential investors. These typically contain valuable information to the investors, regulators, bankers and investment analysts, and to corporate employees. Each reader may wish to annotate and retain one or more different portions of the report for future reference. However, due to the bulk of these reports, most of these reports are typically kept for one or two years, at most. This contributes much to the loss of accumulated wisdom in the business and investment community, and keeps in depth research out of reach of most investors.

Corporations can keep publishing the corporate reports, and in addition submit a copy in Adobe PDF, 'MS Reader' or other formats to the system for permanent archival. The company joins as an IP-Owner member, having a unique member id and password, and pays the applicable first financial contribution for each IP contributed. As a service to the investing public, the company may decide to not implement any access fee, and instead contributes to a retrieval fund to cover the costs associated with access and retrieval. In accordance with privacy considerations, the company could obtain usage reports related to IP-User access from the system.

Investors, bankers, investment analysts and corporate employees can access the corporate reports. After accessing the system, and signing up as members, they can access the particular pages of information of interest, make comments/annotations and keep a copy of their personalized access file. The IP-User can also email the access file to a member colleague or client who can then immediately access the exact same report plus the sender's comments. The recipient can further add comments/annotation can create their own second generation personalized access file for their own efficient filing needs. Additionally the system can be organized to provide "proof of receipt" of disclosure documents by investors where such proofs are required by regulators.

Accordingly, corporations are now able to minimize or avoid sending printed hardcopy annual and quarterly reports and information circulars to many of its shareholders and investors, thus reduce communication costs and environmental impact.

Web Page Content

Many web pages contain report or information that is useful for future reference. Users typically 'bookmark' these. Web sites therefore often have to maintain old web pages at the costly servers in order to provide continuous access by users, or replace the pages and render the IP-Users' bookmarks useless. Users can also email the report to themselves or cut and paste it to a word processing software for future reference. All of these options are inefficient, may involve copying of very large files to user's computer, and most do not allow annotation on the content.

A Web page owner, corporate or individual, such as ABC.com or National Post newspaper, can join as member of the Community and be assigned its unique member id. It will pay a fee to submit the web page content for archiving. It will provide the required 'index tag' information, and specify the various allowable levels access and associated fees within the revenue sharing structure. Upon completion, it will be allowed to use the Community's unique logo to advise its web users the availability of the new access feature. Software can then be downloaded to add special buttons for easy access from the web page to the Community and the specific stored IP. The IP-Owner will receive payment for his share of the revenue periodically upon reaching some administrative thresholds. It will also receive analysis of the IP-User's traffic if subscribed for.

A web page user will be able to click on the Community's unique 'button' located on the web page and access the Community and archive system. Upon signing up as a member using downloaded files, and payment for 'points' or 'purchase credit' into his account, the IP-Users will be able to call up the IP referred to. He can then decide the level of access he wishes to have for this particular piece of IP: view only, view and print copy, view, print and download, or others, in relations to the fees payable. The small fee payable will be deducted from his account, which the member user will be reminded to top up periodically, with offline or secured online payments.

Newspaper, Magazine and Journal Articles

Many newspapers, magazines and journals, such as 'New England Journal of Medicine', 'Nature' and 'New York Times', publish well researched articles and reports that are often quoted in subsequent works of others. However, the publishers (IP-Owners) receive minimal "residue revenues" from these IP, beyond the initial sale. The lack of profitability in turn led to minimal archiving of the IP. On the other hand, readers of these publications often wish to retain some reports, or parts of some, for future reference. They typically keep the physical copy of the journal on shelves, keep pages cut from the journal in folders, or keep photocopies of it in folders. These then have to be indexed, cross-referenced and stored to enable later retrieval. The tedium and costs of this exercise often far outweigh the potential benefits of good references.

This group of IP-Owners can join as members of the Community and benefit from the shared capital costs, economy of scale and pooled operational expertise of the operating entity. They will agree to abide to the terms and conditions of the Community and pay membership fee plus fees to submit the printed content in acceptable formats to archival system for archiving. They will also provide for each submitted IP, the associated meta-data information, and specify the various allowable levels access and associated fees within the revenue sharing structure. Upon completing these steps, they will be allowed to use the Community's unique logo to advise its web users the availability of the new access feature. The IP-Owners will get a share of the revenue generated from user fees, to be disbursed periodically upon reaching some administrative thresholds. They will also receive analysis of the IP-User's traffic if subscribed for.

A reader can access the archived IP on the archival system in two ways:

First, a reader can write down with pen and paper, 'skeleton' key information such as publication name, issue date, page number, full or partial title, author name or other distinctive keywords. Later, he can log on the system/Community, and after signing on as an IP-User, access the specific IP by inputting the particulars. The application program will present the title and summary information of the specific IP for review. Upon deciding what level of access and paying for it, the IP-user can access the IP and create an Access file. The access file may include comments, bookmarks, highlighting, underlining, etc. He can then store this access file on his computer and link it to a number of folders of interest, and/or email it to a colleague for further review.

Second, the reader can note this 'skeleton' key information on a PDA. Later, he can use a charging/synchronization cradle or cable to connect the PDA to his PC that is linked to the Internet. After he signs on via his PC to the Community as a member, a software 'plug-in' provided to him in the membership package will automatically synchronize the 'skeleton' access file information between the PC and the PDA. The software will also use this new 'skeleton' key information to search the archival system and create new access files. The IP-user can then review and access these IP and embellish the access file as appropriate. Upon completing his review, he can synchronize the folders of access file between his PC and his PDA.

In both cases, the IP-user may opt to subscribe to additional service on the archival system to establish as a back-up, a secured online copy of selected access file folders contained in his PC. This copy can be synchronized amongst the online back-up, the PC, and the PDA, if applicable.

Furthermore, if any newly created access file is deemed to be of significant intellectual value, the IP-User may then decide to submit, as an IP-Owner, the access file as a new IP for archiving, and sale in the Community.

Medical Procedure: e.g. by a Surgeon Via Video

In the area of medical training and development, video recordings are often used to teach new medical procedures and techniques. These provide greater reach than having observers above the operating theatre. The use of a video recording archived in the archival system, coupled with verbal or written comments from leading experts in the field using the access file, will enable fast and efficient dissemination of the information. Consistency of information is ensured using one single version of the permanently archived IP (video recording) and wide distribution is made possible by sending the small access files through the Internet. The learners will all enjoy the benefit of 'assured permanent access' to the teaching material, without the tedium of physical storage of books and tapes, and the ability to add comments and other annotations to track progress, all in his own small and efficient access files stored in his PC or PDA.

While the invention has been described with reference to several preferred embodiments, it is to be clearly understood by those skilled in the art that the invention is not limited thereto. Rather, the scope of the invention is to be interpreted only in conjunction with the appended claims.

The embodiments of the invention in which an exclusive property or privilege is claimed are defined as follows:

1. A method for archiving IP comprising the steps of:
    establishing a digital archive system capable of receiving and storing IP contributed by an IP-Owner, comprising at least:
        a network, a server connected to the network, a database system, a content management system, a mirror server, an onsite backup system, an offsite backup system, a disaster recovery system, and
        one or more redundancy sub-systems each comprising at least a server connected to the network, a database system, a content management system and an onsite backup system;
    receiving the IP contributed by the IP-Owner;
    assessing specific characteristics of the IP;
    determining the cost of archival for the received IP associated with each of a multiple available combinations of archival periods and archival redundancy levels;
    presenting via the network to IP-Owner the cost of archival for the received IP associated with each of multiple available combinations of archival periods and archival redundancy levels;
    accepting via the network the combination of archival period and level of archival redundancy selected by the IP-Owner;
    receiving an initial financial contribution on behalf of the IP-Owner, at least a portion of which forms a discrete archival endowment having a minimum quantum sufficient to maintain the IP in the digital archive system for the selected archival period and level of archival redundancy without the need for further financial contributions;
    archiving the IP within the digital archive system and the redundancy sub-system at the selected level of archival redundancy; and
    applying the discrete archival endowment to maintain the IP in the digital archive system for the archival period and the level of archival redundancy, consisting at least the steps of:
        establishing a specific endowment account for the specific IP;
        investing the principal amount of the specific endowment account for the specific IP;
        assessing the current and future periodic (monthly, quarterly or yearly) cost of maintaining the specific IP in the archiving system;
        disbursing periodically to the operational segment of the archiving system the periodic operating cost for the specific IP, from the investment returns of the endowment account;
        recording, updating and maintaining a database of disbursement records for archived IPs;
        linking the disbursement record for the specific IP to the specific IP stored in the archive system.

2. The method of claim 1 wherein the minimum quantum of the discrete archival endowment is determined using actuarial calculations.

3. The method of claim 2 wherein the minimum quantum of the discrete archival endowment is determined comprising the steps of:
    determining the initial capital cost for archival of each IP;
    determining a series of per unit periodic operating costs including operational contingency, for the archival of each IP as a function of archival characteristics of the IP, including the level of archival redundancy; and
    determining the value of the discrete archival endowment which produces a funding stream equal to or greater than the initial capital cost plus the series of per unit periodic operating costs.

4. The method of claim 2 wherein a plurality of IP are contributed by a one or more IP-owners, further comprising the steps of:
    aggregating each of the discrete archival endowments for each of the plurality of IP into a pooled archival endowment fund;
    managing the pooled archival endowment fund; and
    applying the managed, pooled archival endowment fund to maintain each of the plurality of IP in the digital archive system without the need for further financial contributions.

5. The method of claim 4 further comprising the step of both time and version locking the IP so that it remains invariant once archived.

6. The method of claim 4 further comprising the step of establishing a trustee for the management of the archival endowment fund.

7. The method of claim 4 further comprising the step of applying insurance coverage to backstop the health of the archival endowment fund.

8. The method of claim 4 further comprising the steps of:
managing the operations and maintenance of the digital archive system; and
managing the archival endowment fund with a trustee, said trustee having a mandate for managing the archival endowment fund which is separate from the managing of the digital archive system.

9. The method of claim 8 further comprising the steps of:
monitoring at least a discrete archival endowment for an IP and establishing financial indices representing its status; and
displaying the status of the financial indices to those managing the digital archive system.

10. The method of claim 8 further comprising the steps of:
monitoring at least characteristics indicative of the integrity of the IP archived in the digital archive system and establishing technical indices representing its status; and
displaying the status of the technical indices to those managing the digital archive system.

11. The method of claim 8 further comprising the steps of:
monitoring at least a discrete archival endowment for an IP and establishing financial indices representing its status;
monitoring at least characteristics indicative of the integrity of the IP archived in the digital archive system and establishing technical indices representing its status; and
displaying the status of the financial and technical indices to those managing the digital archive system.

12. The method of claim 4 further comprising the step of receiving donations for funding the support of the digital archiving system.

13. The method of claim 12 further comprising the step of managing the donations with a trustee, said trustee having a mandate for managing the donations which is separate from management of the digital archive system.

14. The method of claim 4 further comprising the step of accepting donations for funding management of the archival endowment fund.

15. The method of claim 14 further comprising the step of establishing a trustee for the management of donations.

16. The method of claim 4 further comprising the steps of:
accepting donations for sponsoring contribution and archival of the IP;
aggregating the donation with the archival endowment fund; and
downwardly adjusting the quantum of each financial contribution for IP subsequently contributed to the digital archive system.

17. The method of claim 4 further comprising the steps of:
establishing classifications of IP contributed to the digital archive system;
accepting donations for sponsoring the digital archival of a specific classification of IP;
aggregating the donation with the archival endowment fund;
determining if an IP being contributed qualifies as being within a sponsored classification; and
downwardly adjusting the quantum of each financial contribution for IP which qualifies as being within the sponsored classification.

18. The method of claim 4 further comprising the step of receiving a discrete retrieval endowment having a minimum quantum of which is sufficient to maintain a finite retrieval rate of each IP from the digital archive system without the need for further financial contributions.

19. The method of claim 18 wherein the minimum quantum of the discrete retrieval endowment is determined using actuarial calculations.

20. The method of claim 19 wherein the minimum quantum of the discrete retrieval endowment is determined comprising the steps of:
determining a series of per unit periodic operating retrieval costs for retrieval of each IP as a function of specific characteristics of the IP and a finite retrieval rate; and
determining the value of the discrete retrieval endowment which produces a funding stream equal to or greater than the series of per unit operating retrieval costs.

21. The method of claim 20 further comprising the step of receiving the discrete retrieval endowment as a portion of the initial financial contribution received when the IP is contributed.

22. The method of claim 18 further comprising the steps of:
aggregating each of the discrete retrieval endowments for each of a plurality of IP into a pooled retrieval endowment fund, and
managing the pooled retrieval endowment fund; and
applying the pooled retrieval endowment fund so as to fund retrieval of each of a plurality of IP from the digital archive system without the need for further financial contributions.

23. The method of claim 22 further comprising the steps of establishing a trustee for the management of the retrieval endowment.

24. The method of claim 22 further comprising the step of applying insurance coverage to backstop the health of the pooled retrieval endowment fund.

25. The method of claim 4 further comprising the steps of:
receiving a financial contribution on behalf of the IP-Owner which is directed into a technology sinking fund; and
periodically applying the technology sinking fund to improve the digital archive system.

26. The method of claim 25 wherein the quantum of the financial contribution for the technology sinking fund is determined using actuarial calculations.

27. The method of claim 26 wherein the quantum of the financial contribution for the technology sinking fund is determined comprising the steps of:
determining a series of per unit periodic sinking fund costs for the plurality of IP contributed to the digital archive system; and
determining a value for the technology sinking fund which produces a funding stream equal to or greater than the series of per unit periodic sinking fund costs.

28. The method of claim 4 further comprising the steps of:
integrating the digital archive system with a distributed communications network; and
enabling access to the IP, by one or more IP-Users, through the network.

29. The method of claim 28 further comprising the steps of:
assigning at least one permanent address for the digital archive system on the network; and
enabling access to the IP, by one or more IP-Users, through the at least one permanent address.

30. The method of claim 28 further comprising the steps of:

assigning one or more unique codes for each IP, at least one of which being a unique permanent address within the digital archive system; and enabling access to the IP, by one or more IP-Members, at the at least one such code.

31. The method of claim 4 further comprising the steps of:
receiving a request from an IP-Member for assignment of a unique name for identification of an IP-Member; and
managing the unique names and IP-Members including vetting the suitability of the unique name for the IP-Member.

32. The method of claim 31 further comprising the steps of:
auctioning the requested unique name amongst the IP-Members;
receiving auction proceeds from a successful IP-Member; and
applying the auction proceeds for the maintenance of the digital archive system.

33. The method of claim 4 further comprising the steps of:
establishing a community of IP-Members; and
enabling access to the IP by the IP-Members.

34. The method of claim 33 further comprising the step of verifying the identity of the IP-Member before enabling their access to the IP.

35. The method of claim 33 further comprising the step of accepting payment of one or more fees from the IP-Member to establish their membership in the community.

36. The method of claim 35 further comprising the step of licensing the IP-Member to use identifying marks of the digital archive system.

37. The method of claim 33 further comprising providing an application program to the IP-Member upon establishing their membership in the community for enabling access to the IP.

38. The method of claim 37 further comprising the steps of:
providing an application program for use by the IP-Owner to prepare the IP for contribution to the digital archive system;
establishing the IP-Owner's identity and ownership and accepting payment of the discrete archival endowment;
contributing a digital form of the IP for archival in the digital archival system and any informational tags associated therewith; and
formatting the IP as necessary for acceptance by the digital archival system.

39. The method of claim 38 further comprising the step of receiving information from the IP-Owner which identifies and describes the IP for subsequent searching and retrieval by other IP-Members.

40. The method of claim 37 further comprising the step of registering the IP-Owner as an authorized source of IP for subsequent contributions.

41. The method of claim 4 wherein the step of receiving of each IP further comprises the step of establishing the ownership of the IP by receiving a declaration from the IP-Owner regarding their identity and their claim of ownership to the IP.

42. The method of claim 41 further comprising the step of receiving an affidavit sworn by the IP-Owner for further asserting their claim as IP-Owner.

43. The method of claim 41 further comprising the step of establishing the Identity of the IP-Owner though an exchange of information, the form of which is stipulated by the community.

44. The method of claim 4 further comprising an ownership transfer system for transferring the ownership of IP between a selling IP-Owner and a buying IP-Member, comprising the steps of:

establishing a community of IP-Members and enabling access to the IP by the IP-Members;
un-assigning the selling IP-Owner's ownership of the IP; and
assigning the buying IP-Member as the IP-Owner.

45. The method of claim 44 further comprising the steps of:
applying an escrow service to confirm receipt of satisfactory consideration by the selling IP-Owner; and only then
assigning the buying IP-Member as the IP-Owner.

46. The method of claim 45 further comprising the steps of:
establishing an escrow amount associated with the IP into which consideration for the transfer is deposited on behalf of the buying IP-Member; and
releasing the consideration to the selling IP-Owner once the transfer is approved.

47. The method of claim 46 further comprising the steps of:
establishing a remittance threshold for the escrow account, the threshold being associated with value in the account and an elapsed administrative period;
accumulating revenue from the IP into the escrow account; and
remitting a lump sum value from the escrow account to the IP-Owner which exceeds the threshold value or which exceeds the elapsed administrative period.

48. The method of claim 44 wherein prior to assigning ownership of the IP to the buying IP-Member, further comprising the step of receiving both a request by the buying IP-Member for title insurance and a payment corresponding thereto.

49. The method of claim 4 further comprising the steps of:
establishing a community of IP-Members;
enabling access to the IP by the IP-Members;
indexing the IP in the digital archive using information tags;
cross-referencing related IP; and
searching the indexed IP.

50. The method of claim 49 further comprising the steps of searching the indexed IP using third party search engines.

51. The method of claim 4 further comprising the steps of:
establishing a community of IP-Members and enabling access to the IP by the IP-Members; and
establishing a rights transfer system for an IP-Owner as an IP-Member to transfer some or all of rights associated with their IP to the community of IP-Members for publication and distribution of the IP to the IP-members.

52. The method of claim 51 wherein the IP-Owner specifies one or more particular IP-Users who can retrieve the IP-Owner's IP.

53. The method of claim 4 further comprising the steps of:
establishing a community of IP-Members and enabling access to the IP by the IP-Members;
establishing a member account with the digital archive system;
receiving a deposit from the IP-Member for deposit to the member account; and
recovering at least a retrieval fee from the member account.

54. The method of claim 53 further comprising the steps of:
establishing an IP-Points account with the digital archive system;
receiving a financial contribution from the IP-User;
determining an equivalent value of IP-Points corresponding to the financial contribution
depositing the IP-Points to the IP-Points account; and
recovering the retrieval fee from the IP-Points account.

55. The method of claim 54 further comprising the step of depositing IP-Points to IP-Users IP-Point accounts for predetermined use of the digital archive system.

56. The method of claim 54 further comprising the steps of:
identifying third party customer loyalty program for partnership with the community, the third party customer loyalty program having loyalty points;
defining a relative value between the loyalty points and the IP-Points;
providing a mechanism for the issue, exchange and redemption of IP-Points; and
establishing a value for an exchange of IP-Points with the loyalty points of the third party customer loyalty program.

57. The method of claim 4 further comprising the steps of:
providing access to the digital archive system by a community of IP-members which includes at least IP-Owners and IP-Users, and through an electronic communications network;
maintaining a unique user identifier and a unique user password combination for each IP-Member; and
enabling access to the digital archive for the IP-Members.

58. The method of claim 57 further comprising the step of:
creating an access file for an IP-Member which contains information associated with a specific IP archived in the digital archive system; and
accepting information provided by the IP-Member which relates to the IP-Member's particular interest in the IP.

59. The method of claim 58 wherein the access file information associated with a specific IP comprises IP-Member annotations, excerpts, or attachments.

60. The method of claim 58 further comprising the step of storing the access file locally with the IP-Member to facilitate access to the IP archived with the digital archive system over the communications network.

61. The method of claim 58 further comprising the steps of:
managing a plurality of access files associated with a plurality of IP including searching for a specific IP or for the information associated with a specific IP.

62. The method of claim 4 further comprising the steps of:
establishing one or more categories of IP;
establishing the value of a subscription fee for retrieval of each category of IP;
receiving an election from the IP-Owner regarding which category of IP to associate their IP and authorizing access to their IP on a subscription basis in return for a pro-rata share of net revenues from the subscription fees;
receiving a subscription fee from an IP-User of the archival system for enabling access to the one or more categories of IP; and
allocating the net revenue from the subscription fees to the IP's IP-Owner based on predefined formula.

63. The method of claim 4 further comprising the steps of:
establishing a community of IP-Members, which includes at least IP-Owners and IP-Users;
receiving a membership fee from IP-Members; and
recovering a retrieval fee from an IP-User for accessing IP associated with an IP-Owner.

64. The method of claim 4 further comprising the steps of:
establishing one or more redundancy archival category-sub-systems for categories of IP such as type, format, subject area and sponsorship; and
maintaining copies of the selected IP on the one or more such redundancy archival category-sub-systems.

65. The method of claim 64 further comprising the step of allocating a portion of the archival endowment fund for maintaining the copies of the IP in the one or more redundant archive systems for the archival period.

66. The method of claim 4 further comprising the steps of:
assigning access rights to IP archived with the digital archive system; and
designating a specific IP as being private for access only by those specifically authorized by the IP-Owner.

67. The method of claim 4 further comprising the steps of:
enabling access to IP by the one or more IP-Members;
receiving derivative IP contributed by an IP-Member, the contributed derivative IP being related to the IP, the IP-Member becoming an IP-Owner of the derivative IP, the derivative IP itself becoming IP contributed by the IP-Owner; and
performing the steps of assessing the specific characteristics of the IP being contributed by the IP-Owner, receiving an initial financial contribution from the IP-Owner which includes a discrete archival endowment, and archiving the IP with the digital archive system.

68. The method of claim 4 further comprising the steps of:
establishing a community of IP-Members and enabling access to the IP by the IP-Members including IP-Owners;
establishing content guidelines for contributions of IP made by an IP-Owner;
assessing one or more consequences upon the IP-Owner for breach of the guidelines; and
revoking an IP-Owners membership to the community and to the digital archive system for breach of the guidelines.

69. The method of claim 68 further comprising the step of polling the community for establishing the guidelines.

70. The method of claim 4 further comprising the steps of:
establishing a community of IP-Members of at least IP-Owners and IP-Users; and
recovering a retrieval fee from an IP-User for accessing IP associated with an IP-Owner; and
distributing at least a portion of the retrieval fee to the IP's IP-Owner.

71. The method of claim 70 further comprising an integrated digital rights management (DRM) system comprising the steps of:
receiving a request from an IP-Member for access to IP at a preferred access level;
receiving the payment from the IP-Member, the amount of the payment commensurate with the preferred access level for the requested IP;
enabling access by the IP-Member to the requested IP; and
compensating the IP-Owner of the IP for each payment received.

72. The method of claim 4 further comprising a localized IP access system comprising the steps of:
establishing a community of IP-Members; and
providing a custodial application (CSW) for operation on a single IP-Member's computer, the CSW being operational on the computer for
creating secure storage which can only be interfaced with the CSW,
retrieving a requested IP from the digital archival system and storing an IP copy locally in the secure storage via CSW, and
providing the IP-Member access to the IP copy via CSW according to the IP-Member's preferred access level previously established with the digital archival system.

73. The method of claim 72 further comprising a system for transferring rights to an IP copy in a localized IP access system from a sending IP- Member to a receiving IP-Member comprising the steps of:
    establishing operation of the CSW on a single computer of each of the sending and receiving IP-Members;
    transmitting an unique user identifier of the receiving IP-Member to the sending IP-Member's;
    encrypting the IP copy via the sending IP-Member's CSW and using the receiving IP-Member's unique user identifier transmitted so as to be decrypted only by the receiver IP-Member's CSW;
    transmitting the encrypted IP copy to the receiving IP-Member;
    deleting the IP copy at the sending IP-Member's computer;
    decrypting the IP copy via the receiving IP-Member's CSW using the receiving IP-Member's identifier, and
    re-encrypting the IP for secure storage at the receiving IP-Member's system for subsequent authorized retrieval.

74. The method of claim 4 further comprising the steps of:
    establishing a community of IP-Members and enabling access to the IP by the IP-Members wherein a plurality of IP-Members who are IP-Owners are marketing their IP; and
    providing a co-marketing arrangement between the marketing IP-Owners and the community to establish marketing consistency for the plurality of marketed IP.

75. The method of claim 4 further comprising the step of monitoring the marketing of the IP by the community to ensure compliance with community guidelines.

76. The method of claim 4 further comprising the steps of:
    establishing management which maintains the digital archive system, the management then;
    inspecting an affiliate management having a redundant archival system for a capability and a capacity for maintaining IP in the redundant digital archive system; and
    advising and supervising the affiliate management for its capability and capacity for maintaining IP for the archival period without the need for further financial contributions.

77. The method of claim 76 further comprising the steps of organizing specific affiliate management and redundant archival systems for the archiving of IP of diverse content.

78. The method of claim 4 further comprising the steps of:
    establishing a community of IP-Members; and
    assigning agents of the community for the operation of the digital archive system.

79. The method of claim 4 further comprising the steps of:
    establishing a community of IP-Members and enabling access to the IP by the IP-Members;
    including a distributor as a partner to the community;
    authorizing the distributor to distribute at least some of the IP under license to the IP-Users; and
    receiving a revenue stream from the distribution of the IP;

80. The method of claim 79 wherein the distributor IP-Member is a publisher, an IP-exhibitor or a broadcaster, the broadcaster being selected from the media group consisting of radio, television and the internet.

81. The method of claim 79 further comprising the steps of:
    creating a digital envelope containing the IP;
    delivering the digital envelope to a specified distributor IP-Member, said digital envelope and specified IP therein being restricted for access only by the distributor; and
    monitoring each access to the IP in the digital envelope as representative of at least a revenue associated therewith.

82. The method of claim 79 further comprising the step of accepting at least a security deposit from a distributor IP-Member for the use of the specified IP.

83. The method of claim 79 further comprising the step of establishing a database of characteristics of the distributor's access to the IP in the digital envelope and of a receiving audience.

84. The method of claim 4 further comprising the steps of:
    establishing management which maintains the digital archive system;
    establishing a community of IP-Members and enabling access to the IP by the IP-Members;
    accepting a partner to the community, said partner contributing IP for which copyright rights have expired and which are accessible by IP-Members; and
    receiving an initial financial contribution from the partner for each IP contributed by the partner, the quantum of said initial financial contribution being at least equal to the discrete archival endowment for the IP.

85. The method of claim 84 further comprising the step of determining a retrieval fee for access by IP-Members to the IP, at least a portion of which is distributed to the partner.

86. The method of claim 4 further comprising the steps of:
    establishing a community of IP-Members;
    enabling access for the IP-Members to the IP and recovering a retrieval fee for each retrieval of a specific IP; and
    determining a revenue stream from the retrieval fees associated with a specified IP for calculating a capitalized value of the specific IP.

87. The method of claim 86 further comprising the step of conducting a sale and purchase transaction of the IP between IP-Members based upon the capitalized value wherein the revenue stream is a historical revenue stream.

88. The method of claim 87 further comprising the step of collecting a commission for the transaction.

89. The method of claim 86 further comprising the step of conducting a sale and purchase transaction of the IP between IP-Members based upon the capitalized value wherein the revenue stream is a forecast revenue stream.

90. The method of claim 89 further comprising the step of collecting a commission for the transaction.

91. The method of claim 86 further comprising the step of aggregating IP having capitalized values and having related characteristics into a pool available for sale and purchase transactions.

92. The method of claim 4 further comprising the steps of:
    establishing a community of IP-Members and enabling access for the IP-Members to the IP;
    recovering a retrieval fee for each retrieval of a specific IP and generating a revenue profile therefore; and
    analyzing the revenue profile for identifying specific IP for use in a venture capital or investment funding vehicle.

93. The method of claim 4 wherein the archival period is between zero years and perpetuity.

94. The method of claim 93 further comprising the step of associating a unique code to IP which have an archival period being a finite period less than perpetuity.

95. The method of claim 4 further comprising the steps of:
    establishing a community of IP-Members of at least IP-Owners and IP-Users;
    recovering a retrieval fee from an IP-User for a paid access right for accessing a specific IP associated with an IP-Owner at a specific level of access;
    registering information regarding the paid access right of the IP-User who has paid the retrieval fee to access the specific IP at a specific level of access;

enabling the paid IP-User to access, at a specific level of access, the specific IP archived in the community;

enabling access by that specific IP-User to that specific IP at that specific access level for an access fee which may be zero;

providing redundancy backup of the IP-User registration information and the accessed IP to facilitate and assure future access by the IP-User;

receiving at least a portion of the retrieval fee as an access fee from the IP-User; and distributing the access fee to the IP's IP-Owner.

96. The method of claim 95 further comprising an integrated digital rights management (DRM) system for the transfer of a paid access right to a specific archived IP from one IP-User to another IP-User, comprising the steps of:

receiving a request from an IP-User as a selling IP-Owner to transfer to another IP-User the paid access right to a specific IP and the price for the transfer, which may be zero;

receiving a payment, if any, from an buying IP-User, for the paid access right to a specific IP to be transferred from the selling IP-User;

receiving a payment of a transfer payment from the buying IP-User or the selling IP-User, or both; and disbursing the net proceed of the transfer payment to the selling IP-User.

97. The method of claim 96 further comprising an ownership transfer system for transferring the ownership of the access right to a specific IP between a selling IP-User and a buying IP-User, comprising the steps of:

registering the access right acquired by the buying IP-User;

de-registering the access right of the selling IP-User;

issuing instructions to DRM software of the DRM system of the selling IP-User to update the list of specific IP by deleting the sold access right and deleting any local copy of the specific IP previously made available to the selling IP-User;

issuing instructions to the DRM software used by the buying IP-User to update the list of specific IP by adding the bought access right issuing confirmation notices to both the selling IP-User and the buying IP-User; and indexing and archiving information related to the ownership transfer.

98. The method of claim 4 further comprising the steps of establishing management which maintains the digital archive system;

establishing a community of IP-Members and enabling access to the IP by the IP-Users;

accepting a research, library, archive or professional association partner to the community, such partner referring or contributing individual researchers or members, or groups of researchers or members, associated with the partner as IP-Users of the community;

recovering a retrieval fee from an IP-User for accessing, at a specific level of access, a specific IP associated with an IP-Owner;

receiving at least a portion of the retrieval fee as an access fee from the IP-User for facilitating the access;

distributing at least a portion of the access fee to the IP's IP-Owner;

distributing as least a portion of the access fee to the referring or contributing partner; and collecting, analyzing and storing with redundancy backups the usage and financial information for operational management and for distribution of the IP.

99. The method of claim 4 further comprising the steps of establishing management which maintains the digital archive system;

establishing a community of IP-Members and enabling access to the IP by the IP-Users;

accepting an educational or institutional partner to the community, such partner contributing individual learners or groups of learners associated with it as IP-Users of the community;

receiving financial contribution from such partner to be applied towards the retrieval fees for access of specific IP by the partner's learners;

receiving specifications from such partner the subjects, access levels, time periods and similar criteria for such prepaid access;

managing such prepaid access by such learners;

collecting, analyzing and storing with redundancy backups the usage and financial information for operational management and for distribution of the IP; and issuing usage and financial reports to the partner.

100. The method of claim 1 further comprising a method for enhancing use of an under-utilized facility comprising:

storing and managing information relating to IP having information associated therewith, the IP being archived in the digital archive system, the information including IP-Owners and terms of use of the IP including royalties;

storing and managing information relating to the availability of the facility;

contacting individuals targeted by a stakeholder in the use of the facility, the individuals forming an audience for viewing the IP system;

storing information relating to stakeholders and individuals of an audience; and arranging exhibition of the IP at the facility at specific times and terms; and collecting revenue and distributing revenue to at least the stakeholder and the IP-Owner.

101. A system for archiving digital versions of IP comprising:

a network;

at least one archival computer system connected to the network for archiving one or more IP, each IP being associated with an archival period and an archival cost;

at least one archival redundancy computer sub-system connected to the network for archiving one or more IP, each IP being associated with an archival period and an archival cost;

an application program for receiving IP through the network and at the archival computer, each IP being contributed by or on behalf of a IP-Owner connected to the network, the application program further assessing the archival cost associated with archiving the IP for combinations of the archival period and level of redundancy, and still further for determining a minimum quantum of a discrete archival endowment sufficient to satisfy the archival costs and thus maintain the IP in the digital archive system for the archival period and level of redundancy without the need for further financial contribution;

commerce means for receiving an initial financial contribution from or on behalf of the IP-Owner so that upon receiving the initial financial contribution which is at least the minimum quantum of the discrete endowment, the application program archives the IP on the digital archive system and maintains the archived IP in the digital archive system for the archival period;

an application program for assigning specific endowment account to specific archived IP;

investing the principal amount of the specific endowment account; assessing the current and future periodic operating cost of archiving the IP;

periodically disbursing from the investment returns of the endowment account to the operational segment of the archiving system, the periodic operating cost for the specific IP;

recording, updating and maintaining a database of records of such disbursements; and linking such disbursement records to the specific archived IP in the archival system.

102. The system of claim 101 wherein the application program further comprises actuarial calculation means for determining the minimum quantum of the discrete archival endowment.

103. The system of claim 102 further comprising a pooled archival endowment fund which aggregates the discrete archival endowments from the commerce means and funds each of the archival costs associated with each of the archived IP in the digital archive system for each of their respective archival period and level of redundancy.

104. The system of claim 103 further comprising:

an operating entity which maintains the digital archive system and maintains each archived IP for its archival period and level of redundancy, upon one or more payments which satisfy the archival costs; and a separate trustee having a mandate separate from that of the operating entity and which manages the discrete archival endowments for each IP and then remunerates the operating entity for each of the archival costs associated with each of the archived IP in the digital archive system for each of their respective archival periods and level of redundancy.

105. The system of claim 104 further comprising a technology sinking fund for receiving a portion of the initial financial contribution from the contributing IP-Owner which is in excess of the discrete archival endowment and which is periodically disbursed to the operating entity for improving the digital archive system.

106. The system of claim 101 further comprising a facility utility enhancement system for presentation and viewing of IP at an under-utilized facility comprising:

a rights management system for storing and managing information relating to IP having information associated therewith including IP-Owners and terms of use of the IP including royalties;

a facility availability database system for storing and managing information relating to the availability of the facility;

an audience contacting system for enabling a stakeholder to contact individuals targeted by the stakeholder as the audience for viewing the IP;

a booking system enabling the stakeholder to arrange exhibition of the IP at the facility at specific times and terms;

an information database for, storing information relating to stakeholders and individuals of an audience; and a revenue determination, collection, accounting and royalty distribution system.

107. The facility utility enhancement system of claim 106 further comprising means to inspect and audit facilities for operations and accounting records.

108. The facility utility enhancement system of claim 107 further comprising a communications network for interfacing the facility availability system, the rights management system, the booking system, the audience acquisition system and the revenue system.

109. The facility utility enhancement system of claim 108 wherein the presentation facility is an auditorium, theatre, meeting room, classroom, gymnasium or stadium.

110. The facility utility enhancement system of claim 109 wherein the intellectual properties are audio-visual media.

111. The facility utility enhancement system of claim 110 wherein the audio-visual media are selected from the group consisting of movies, documentary films, educational films or promotional films, and broadcasts of live and recorded events.

112. The facility utility enhancement system of claim 111 wherein the stakeholder is one of the owner of the facility, the representative of the owner, the manager of the facility, a person or persons having nexus with the audience; or a combination thereof.

113. The facility utility enhancement system of claim 106 further comprising:

a computer servers having input and output interfaces, mirror servers, backup and disaster recovery systems;

a communication network; and computer software for database management, data encryption, payment receipt and accounting, revenue disbursement and IP rights management.

114. The facility utility enhancement system of claim 113 wherein the revenue determination, collection, accounting and royalty distribution system further comprises kiosks or handheld devices for processing and validating entry tickets.

115. The facility utility enhancement system of claim 113 further comprising means for real-time or periodic collection of audience and revenue information.

116. The facility utility enhancement system of claim 113 further comprising:

means to generate supplementary information in the same format as the IP; and means to add the supplementary information to the IP at a desired location therein.

117. The facility utility enhancement system of claim 113 further comprising means for the IP-Owner to submit the IP to a digital archive system for assured archival of the IP on a permanent or predetermined archival period and level of redundancy.

118. The facility utility enhancement system of claim 113 further comprising means for the IP-Owners to submit the IP, or a copy thereof, to a publishing and marketing system.

119. The facility utility enhancement system of claim 118 further comprising means for returning the IP to the IP-Owner.

120. A method for archiving IP comprising the steps of:

establishing an archive system capable of receiving and storing IP contributed by an IP-Owner;

receiving the IP contributed by the IP-Owner;

assessing specific characteristics of the IP;

receiving an initial financial contribution on behalf of the IP-Owner, at least a portion of which forms a discrete archival endowment having a minimum quantum sufficient to maintain the IP in the archive system for an archival period and level of redundancy without the need for further financial contributions;

archiving the IP with the archive system;

aggregating each of the discrete endowments for each of a plurality of IP into a pooled archival endowment fund;

managing the pooled archival endowment fund; and applying the pooled archival endowment fund to maintain each of the plurality of IP in the archive system without the need for further financial contributions.

121. The method of claim 120 further comprising the steps of:

managing the operations and maintenance of the archive system; and managing the archival endowment fund with a trustee, said trustee having a mandate for managing the archival endowment fund which is separate from the managing of the archive system.

122. The method of claim 121 comprising the steps of:

enabling access to the IP; and recovering a fee for each access to each IP.

123. A method for archiving tangible representation of IP comprising the steps of:

establishing an archive system capable of receiving and storing a tangible representation of IP contributed by an owner;

receiving the a tangible representation of IP contributed by the owner;

assessing specific characteristics of the a tangible representation of IP;

receiving an initial financial contribution on behalf of the owner, at least a portion of which forms a discrete archival endowment having a minimum quantum sufficient to maintain the a tangible representation of IP in the archive system for an archival period without the need for further financial contributions;

archiving the tangible representation of IP with the archive system;

aggregating each of the discrete endowments for each of a plurality of tangible representation of IP into a pooled archival endowment fund;

managing the pooled archival endowment fund;

applying the pooled archival endowment fund to maintain each of the plurality of tangible representation of IP in the archive system without the need for further financial contributions;

applying the discrete archival endowment to maintain the tangible representation of IP in the archive system for the archival period, consisting at least the steps of:

establishing a specific endowment account for the specific tangible representation of IP;

investing the principal amount of the specific endowment account for the specific tangible representation of IP;

assessing the current and future periodic (monthly, quarterly or yearly) cost of maintaining the specific tangible representation of IP in the archiving system;

disbursing periodically to the operational segment of the archiving system the periodic operating cost for the specific tangible representation of IP, from the investment returns of the endowment account;

recording, updating and maintaining a database of disbursement records for archived tangible representation of IPs;

linking the disbursement record for the specific tangible representation of IP to the specific tangible representation of IP stored in the archive system.

124. The method of claim 123 further comprising the steps of:

managing the operations and maintenance of the archive system; and managing the archival endowment fund with a trustee, said trustee having a mandate for managing the archival endowment fund which is separate from the managing of the archive system.

125. The method of claim 124 comprising the steps of:

enabling access to the tangible representation of IP; and recovering a fee for each access to each tangible representation of IP.

* * * * *